United States Patent [19]

Sawada et al.

[11] Patent Number: 4,649,449

[45] Date of Patent: Mar. 10, 1987

[54] PERPENDICULAR MAGNETIC HEAD

[75] Inventors: Takeshi Sawada; Yasushi Toda, both of Yokohama; Hirokazu Goto, Tokyo, all of Japan

[73] Assignee: Canon Kabushiki Kaisha, Tokyo, Japan

[21] Appl. No.: 705,049

[22] Filed: Feb. 25, 1985

Related U.S. Application Data

[63] Continuation of Ser. No. 366,077, Apr. 6, 1982, abandoned.

[30] Foreign Application Priority Data

| Apr. 15, 1981 | [JP] | Japan | 56-55525 |
| Apr. 15, 1981 | [JP] | Japan | 56-55526 |
| Apr. 28, 1981 | [JP] | Japan | 56-63397 |
| Apr. 28, 1981 | [JP] | Japan | 56-63398 |
| Apr. 28, 1981 | [JP] | Japan | 56-63399 |
| May 28, 1981 | [JP] | Japan | 56-80194 |

[51] Int. Cl.4 .......................... G11B 5/17; G11B 5/127
[52] U.S. Cl. .................................... 360/123; 360/125
[58] Field of Search ............... 360/115, 119, 113, 121, 360/110, 125, 123

[56] References Cited

U.S. PATENT DOCUMENTS

| 4,222,084 | 9/1980 | Nakagawa | 360/119 |
| 4,251,842 | 2/1981 | Iwasaki | 360/119 X |
| 4,253,127 | 2/1981 | Kodama | 360/119 X |
| 4,277,808 | 7/1981 | Nagaki | 360/113 |
| 4,317,148 | 2/1982 | Chi | 360/119 |

FOREIGN PATENT DOCUMENTS 46-15872  4/1971  Japan ............................... 360/121

*Primary Examiner*—A. J. Heinz
*Attorney, Agent, or Firm*—Fitzpatrick, Cella, Harper & Scinto

[57] ABSTRACT

A magnetic head for perpendicularly magnetizing a magnetic recording medium having a first magnetic pole to reverse the magnetization in the magnetic recording medium which has been magnetized beforehand in a certain direction, and a second magnetic pole to control reversal of the magnetization in the recording medium effected by the first pole. This construction (1) provides a high density multi-track structure in the head; (2) increases reproduction output, while lessening influence thereon due to a spacing loss by use of a magnetic material and a magneto-resistive element for the respective magnetic poles; (3) provides lower power consumption and fringe effect noise, and smooth running of the recording medium by constructing the first magnetic pole with a permanent magnet, particularly, in cylindrical form; (4) miniaturizes the magnetic head by reducing the number of the parts, by making one of the magnetic poles the first and second auxiliary magnetic poles, and forming an erasing magnetic pole with the first auxiliary magnetic pole, to improve the writing efficiency; (5) simplifies manufacturing, improves wear-resistance of the poles, and provides high density recording by forming the permanent magnet in a thin film on the recording medium sliding surface of the first magnetic pole by thin film deposition; and (6) prevents cross-talk by providing a load-sharing type winding on one of the poles to reduce the number of windings, and by giving an azimuth angle to the magnetic pole, and improves recording efficiency by connecting both poles.

26 Claims, 42 Drawing Figures

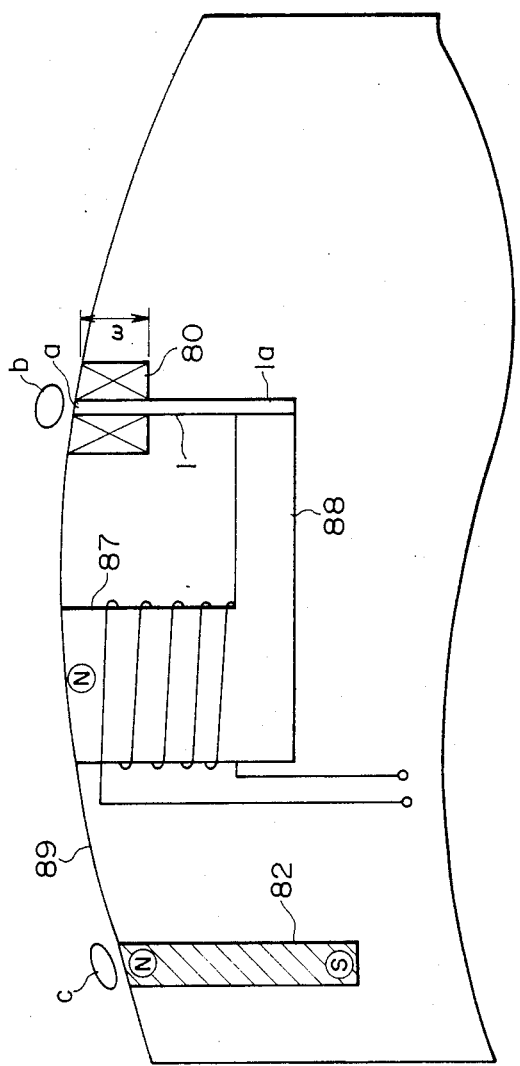
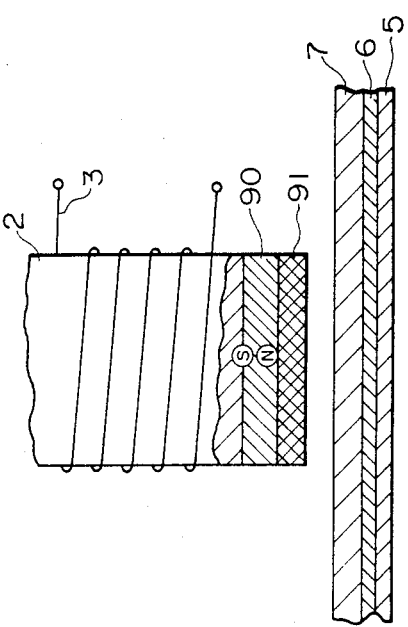
FIG. 12
FIG. 13

PERPENDICULAR MAGNETIC HEAD

This application is a continuation of application Ser. No. 366,077, filed Apr. 6, 1982, now abandoned.

BACKGROUND OF THE INVENTION

1. Field of the Invention

This invention relates to a perpendicular magnetic head which performs recording and reproduction of information magnetized perpendicularly with respect to the recording surface of a magnetic recording medium.

2. Description of Prior Arts

In recent years, there has been adopted a recording system utilizing perpendicular magnetization. The system serves as a high density magnetic recording system capable of rendering a diamagnetic field of the recording magnetization to be zero, and, further, as a system for improving the recording density in the magnetic recording.

Unlike a longitudinal recording system which has so far been used most generally and which leaves in the recording surface of the magnetic recording medium a magnetization direction which is substantially parallel with the recording surface, the perpendicular magnetization system is so constructed that the orientation of the residual magnetization becomes substantially perpendicular to the surface of the recording medium. According to such structure, as the recording wavelength becomes shorter, the diamagnetic field to the recording magnetization is reduced to make it possible to stabilize the magnetization, whereby high density recording becomes practicable. More concretely, while the longitudinal recording system which has so far been used widely is only capable of recording and reproducing information with a wavelength of 1 $\mu$m or so with respect to the running direction of the recording medium, the perpendicular recording system has succeeded in recording and reproducing information with a wavelength as short as 0.3 $\mu$m, and has potential for a higher recording density.

Such conventional perpendicular magnetic recording system will be outlined hereinbelow with reference to its actual construction, function, and various problems inherent therein, in reference to the accompanying drawing.

Type A

Referring first to FIG. 1, a principal magnetic pole 1 is made of a permalloy thin film of high magnetic permeability. At a certain predetermined distance from the principal magnetic pole 1, there is disposed an auxiliary magnetic pole 2 in confrontation to the principal magnetic pole 1. This auxiliary magnetic pole 2 has a winding 3 wound around it. A magnetic recording medium 4 is interposed in a space between the principal and auxiliary magnetic poles 1 and 2. The magnetic recording medium 4 has a perpendicularly magnetizable recording layer 5 with strong perpendicular magnetic anisotropy to the side of the principal magnetic pole 1. This perpendicularly magnetizable recording layer 5 is known to be a stable sputtered film of Co-Cr. A highly permeable layer 6 consisting of a soft magnetic thin film is formed on the side surface of the perpendicularly magnetizable recording layer 5 opposite the principal magnetic pole 1. This highly permeable layer 6 is indispensable for improvement in efficiency of recording and reproduction as well as stability in its magnetization. This double-layer structure in the magnetic recording medium consisting of the perpendicularly magnetizable recording layer 5 and the highly permeable layer 6 is necessary for realizing high density recording in the perpendicular magnetic recording system. These two layers are formed on a base member, or a substrate, 7 which is made of a polyimid film or a foil of aluminum alloy.

In the above-described construction of the magnetic recording system, when electric current is conducted through the winding 3 of the auxiliary magnetic pole 2, magnetic line of force 8 is generated. This magnetic line of force passes through the highly permeable layer 6, concentrates on a point b and its vicinity of the perpendicularly magnetizable recording layer 5 opposing the principal magnetic pole 1, and is absorbed into the principal magnetic pole 1. At this instant, a large magnetic field occurs in the neighborhood of the point b and the magnetic recording medium is magnetized thereby in the perpendicular direction, whereby perpendicular magnetic recording is performed.

In the above-described magnetic recording process, the magnetomotive force required of the auxiliary magnetic pole 2 is of an order of 20 AT (ampere turn) or so. In practice, this degree of magnetomotive force can be obtained with 100 to 400 winding turns of the winding 3 on the auxiliary magnetic pole 2.

In the reproduction of the recorded information, a similar route of the magnetic line of force to that at the time of the recording will follow by the interaction between the principal magnetic pole 1 and the magnetic line of force produced from the magnetic recording medium to induce variations in the magnetic flux in the winding 3, whereby a reproduction output can be obtained.

In such perpendicular magnetic recording system, necessary length of the magnetic recording medium per 1 bit is 0.16 $\mu$m, which is much higher density in the running direction of the recording medium than that in any other sort of recording devices. Hence it has been drawing the attention of all concerned as tne most promising future magnetic recording system.

However, the system is not perfectly free from disadvantage in the following points.

(1) Since it requires a large magnetomotive force, the winding 3 for the auxiliary magnetic pole 2 should have an increased number of winding turns with the consequence that inductance increase to lower the resonance frequency, whereby its driving in a frequency band of a mega-hertz and above becomes substantially difficult.

(2) Increased number of winding turns in the winding 3 of the auxiliary magnetic pole 2 makes it difficult to render the system to be adapted for the high density multi-track construction.

(3) When the multi-tracks are to be driven simultaneously, each track should be given the magnetomotive force of 20 AT and above, which inevitably requires an extremely large amount of electric current, hence increase in electric consumption.

The abovementioned problems will hereinafter be called "Problem A".

Type B

The magnetic recording system shown in FIG. 2 is of such a construction that one end part of the principal magnetic pole 11 consisting of a highly permeable magnetic film is in contact with the magnetic layer 13 of the magnetic tape 12, and the auxiliary magnetic pole 15 magnetic tape 12, and the auxiliary magnetic pole 15 consisting of a highly permeable magnetic material and with a winding 14 wound around it is disposed at a position confronting the principal magnetic pole 11 with the magnetic tape 12 interposed therebetween. In this construction of the magnetic recording system, electric current is passed through the winding 14 to generate a magnetic field by the auxiliary magnetic pole 15, and, by concentrating this magnetic field on the distal end of the principal magnetic pole 11, i.e., on the portion where it is in contact with the magnetic tape 12, the magnetic layer 13 of the magnetic tape 12 is magnetized in the direction perpendicular to the magnetic tape 12.

The magnetic recording device, however, has a disadvantage such that the reproduction of the recorded information is virtually impossible because of extremely low output voltage when the reproduction is to be done. On account of this, the device should be provided with a conventional ring-shaped reproduction head or a magneto-resistive element, apart from the recording head. With the ring-shaped magnetic head, the reproduction frequency characteristic is limited by a length of a magnetic gap in the head. Hence the magneto-resistive element head, in which an equivalent gap length in the ring-shaped head is practically negligible, is generally used.

FIGS. 3 and 4 schematically illustrate the construction of the head utilizing the conventional magneto-resistive element (hereinafter simplified as "MR element").

In the drawing, a reference numeral 16 designates electrode parts of the head using the MR element M, a numeral 17 refers to the direction of magnetization, and a numeral 18 indicates magnetic flux. Reproduction of signals with this device will be done as follows. When the recorded magnetic tape 12 is caused to run, electric resistance of the magneto-resistive (MR) element 16 varies in accordance with the magnetic field applied from the magnetic tape 12. Therefore, the resistance change in the magneto-resistive element is detected, as a voltage change, by flowing a constant d.c. current I through the magneto-resistive element 16 as shown in FIG. 3 and detecting a voltage change V at both ends thereof, whereby the reproduction output is obtained.

When utilizing such MR element-based head as the reproduction head, it was the usual practice that the MR element M was simply opposed to the medium surface of the magnetic layer 13 as shown in FIG. 3. With such construction, however, it is not possible for the magnetic flux 18 emitting from the magnetic layer 13 to form a closed circuit with the consequent disadvantages that drawing of the magnetic flux into the electrode part is inferior, the reproduction output decreases, and the spacing loss keenly reflects on the reproduction output to make it difficult to obtain a stable reproduction output.

The abovementioned problems will hereinafter be called "Problem B".

Type C

In general, when the perpendicular magnetic recording system is adopted, there is required a magnetic head of a construction having both principal and auxiliary magnetic poles arranged with a magnetic recording medium interposed therebetween.

FIG. 5 shows the magnetic head used in the conventional perpendicular magnetic recording system. In the drawing, a reference numeral 21 designates the principal magnetic pole, in opposition to which the auxiliary magnetic pole 22 is provided with the winding 23 being wound therearound. Between this principal magnetic pole 21 and the auxiliary magnetic pole 22, there passes the magnetic recording medium 24. The magnetic recording medium 24 is of such a construction that the high permeability substance layer 26 is formed on one surface of the substrate 27 consisting of a synthetic resin film, etc. to the side of the principal magnetic pole 21, and the perpendicularly magnetizable recording layer 25 is formed on the surface of the layer 26.

In such arrangement of the perpendicular magnetic recording device, the magnetic flux 28 is formed by flow of electric current through the winding 23 of the auxiliary magnetic pole 22. This magnetic flux passes through the high permeability substance layer 26 and concentrates on the distal end part of the principal magnetic pole 21 as shown by a reference numeral 28a to thereby magnetize the perpendicularly magnetizable recording layer 25 in the direction perpendicular to the recording medium and to perform the magnetic recording.

FIG. 6 shows a conventional magnetic recording device, wherein the principal magnetic pole 21 and the auxiliary magnetic pole 22 are arranged to the side of the perpendicularly magnetizable recording layer 25 of the magnetic recording medium 24 with a predetermined clearance being given between them and the medium 24. With such construction, it is also possible to perform perpendicular magnetic recording, since the magnetic flux 28 passes through the high permeability substance layer 26 and concentrates on the principal magnetic pole 21.

However, when the constructions as shown in FIGS. 5 and 6 are adopted, the number of winding turns of the winding 23 to be provided around the auxiliary magnetic pole 22 amounts from a few to several hundred of times and the recording current required amounts to approximately 2 amperes, which is disadvantageous in construction of a multi-tracked head. Further, in view of the increased number of winding turns, inductance in the winding increases resulting in inability of recording high frequency signals in spite of the device being capable of performing high density magnetic recording, hence the device could not be used as a VTR (video tape recorder), etc., and it is not feasible to augment its actual recording density.

On the other hand, while the system of arranging the principal and auxiliary magnetic poles with the magnetic recording medium being interposed therebetween has an advantage of high recording efficiency, the surface of the substrate 27 is lacking in smoothness making it difficult to bring the auxiliary magnetic pole sufficiently close to the surface with the result that the magnetic flux in an amount more than necessary should be produced for the recording.

Furthermore, it has been a general tendency that the auxiliary magnetic pole is given as its width two hundred times or more of the recording wavelength for improving the recording efficiency. In this case, the magnetic recording medium travels unstably to cause such disadvantage that so-called fringe effect noise should inevitably be recorded at the end part of the auxiliary magnetic pole where it separates from the magnetic recording medium.

The abovementioned problems will hereinafter be called "Problem C".

Type D

The problem A as already explained with reference to FIG. 1 can be solved by a construction of the magnetic recording device shown in FIGS. 10 to 13. In the following, explanations will be given as to new problems that derive from such construction.

In FIG. 7, the principal magnetic pole 31 is made of a thin film of highly permeable material such as permalloy having a thickness of 1 μm or so. The first auxiliary magnetic pole 32 and the second auxiliary magnetic pole 33 are made of highly permeable material such as MnZn-ferrite, etc. One end of each of the auxiliary magnetic poles is so disposed that the base end of the principal magnetic pole 31 may be held between these one ends, while the other end of each of them is disposed in confrontation to each other with a certain predetermined distance from the principal magnetic pole 31.

Windings 34a, 34b are wound around the end part of the first and second auxiliary magnetic poles 32, 33 to the side of the principal magnetic poles (i.e., at a portion where these end parts are in contact with the principal magnetic pole 31). These windings 34a, 34b serve for imparting the magnetomotive force for conducting the magnetic reversal to the magnetic recording medium.

At a position away from the first auxiliary magnetic pole 32 at a predetermined distance in the entrance direction of the magnetic recording medium, there is disposed an erasing magnetic pole 35 for arranging in advance the magnetization in the perpendicularly magnetizable recording layer of the magnetic recording medium in a certain definite direction. In the illustrated embodiment, this erasing magnetic pole 35 is made of a permanent magnet with its one end part in the direction of y in FIG. 7 constituting the N-pole.

A reference numeral 39 designates the magnetic recording medium, in which the highly permeable magnetic layer 37 made of a thin film of permalloy, etc. having a thickness of 0.5 to 1 μm is formed on one surface of the base member 38 made of polyester, polyimid, or other like resins, to the side of the principal magnetic pole 31. The perpendicularly magnetizable recording layer 36 having a readily magnetizable axis is formed on the surface of this highly permeable magnetic layer 37 in the direction y. In the illustrated example, the magnetic recording medium is in the form of a tape. In the case of a disc, however, the base member 38 may be made of aluminum alloy, etc.

Both perpendicularly magnetizable recording layer 36 and highly permeable magnetic layer 37 are indispensable for performing the magnetic recording in the direction perpendicular to the recording medium to attain high density recording.

In the following, explanations will be given using a hysteresis loop shown in FIG. 8 as to the magnetic recording process with the device construction as shown in FIG. 7. In the graphical representation in FIG. 8, the abscissa indicates magnitude of the magnetic field, and the ordinate denotes magnitude of magnetization.

Assume that the magnetic recording medium 39 travels in the arrowed direction x in FIG. 7. The perpendicularly magnetizable recording layer 36 is rendered with its magnetization into a certain definite direction by the erasing magnetic pole 35 at a point c opposite the erasing magnetic pole. In the hysteresis loop in FIG. 8, the state of the magnetic erasure is at a point 40.

In the next place, when bias current is applied to the windings 34a, 34b at a point b in FIG. 7 opposite the principal magnetic pole 31 so that a state corresponding to a point 41 on the hysteresis loop in FIG. 8 may be reached, there is applied at a point $d_1$ opposite the first auxiliary magnetic pole 32 a magnetic field in the same direction as that at the point c, though the magnetic field is extremely weak.

In addition to this bias current, there flows through the windings 34a, 34b a signal current in an amount sufficient to pass by the abovementioned point 41, further by a point 42, and reach a point 43 where the magnetic field is reversed. As a consequence, the magnetization remains at the point b opposite the principal magnetic pole 31, and reaches a point 44 in a recorded state after it has passed by a point $d_2$ opposite the second auxiliary magnetic pole 33. Provided that no signal current flows through the winding 34a, 34b, the magnetization at the point 40, which is an erased condition, is maintained, even when it has reached the point $d_2$. Incidentally, the flowing direction of the current in the respective windings 34a, 34b is in mutually opposing directions so that the magnetic flux as generated may pass through the principal magnetic pole 31.

The magnetic flux produced by the windings 34a, 34b passes through the distal ends of both first and second auxiliary magnetic poles 32, 33, passes through the points b and $d_2$ perpendicularly, and concentrates on the point b opposite the principal magnetic pole, thereby drawing a closed loop passing through a point a which corresponds to the distal end of the principal magnetic pole 31.

The reason for separating the auxiliary magnetic pole into the first and second auxiliary magnetic poles 32, 33 is to efficiently form the closed loop of the magnetic line of force as mentioned in the foregoing, whereby improvements in efficiency of the recording and reproduction can be attained.

The signal current may be in a quantity sufficient to perform the magnetization from the point 41 to the point 43 in FIG. 8 as far as the magnetic field is concerned. Since the magnetic field from the zero field to the point 41 is given by d.c. bias current, the recording efficiency improves much more.

Thus, the recording system, in which the recording operation is done after the magnetization has been oriented to a certain definite direction, is highly effective from the point of reducing the recording current.

With a device of the construction mentioned above, however, the following disadvantages would still exist.

(1) Besides the principal and auxiliary magnetic poles, there is also required the erasing magnetic pole resulting in an increased number of component parts.

(2) The volume occupied by the device inevitably increases due to the presence of the erasing magnetic pole.

(3) The magnetic line of force concentrates on corner parts of the surface of the second auxiliary magnetic pole 33, on and along which the magnetic recording medium slides, i.e., a portion in FIG. 7 designated by points $f_1$, $f_2$, and causes occasional erasure of information and, hence unstable recording.

The abovementioned problems will hereinafter be called "Problem D".

Type E

Referring now to FIGS. 9A to 9C, further embodiments of the perpendicular magnetic recording system will be explained hereinbelow.

The conventionally known type of the perpendicular magnetic recording system is of such a construction that the principal magnetic pole 51 and the auxiliary magnetic pole 52 are disposed at mutually opposite positions with the magnetic recording medium 53 being interposed therebetween. The principal magnetic pole 51 is usually made of a thin film of highly permeable magnetic material such as permalloy, etc. having a thickness of 1 $\mu$m or so. The recording and reproduction are done at a portion a which corresponds to the distal end of the magnetic pole 51.

The auxiliary magnetic pole 52 has a winding 55 wound therearound. By electric conduction through this winding 55, there can be obtained the magnetomotive force necessary for reversing the magnetization in the magnetic recording medium. For the auxiliary magnetic pole 52, MnZn ferrite is widely used as the highly permeable magnetic material.

The magnetic recording medium 53 comprises a base member or substrate 59 and a highly permeable magnetic layer 58 having a thickness of 0.5 to 1 $\mu$m formed on one surface of the substrate to the side of the principal magnetic pole 51. For this magnetic layer 58, a thin film of 80% Ni-permalloy is used. On the outer surface of this highly permeable magnetic layer 58, there is formed a perpendicularly magnetizable recording layer 57 of 0.5 to 2 $\mu$m thick having its readily magnetizable axis in the vertical direction shown by a symbol y as shown in FIG. 9A. For this perpendicularly magnetizable recording layer 57, Co-Cr alloy is widely used. Both perpendicularly magnetizable recording layer 57 and highly permeable magnetic layer 58 are indispensable components for attaining high density perpendicular magnetic recording.

The conventional embodiment of the perpendicular magnetic recording system as shown in FIG. 9B uses a permanent magnet as the auxiliary magnetic pole 52, omitting the winding around it. The recording and reproducing signals are transmitted through a winding 56 wound around the principal magnetic pole 51.

The conventional embodiment of the perpendicular magnetic recording system as shown in FIG. 9C is of such a construction that both principal magnetic pole 51 and auxiliary magnetic pole 52 are disposed at one and the same side with respect to the magnetic recording medium 53, wherein the auxiliary magnetic pole 52 is magnetically connected with the principal magnetic pole 51 through a connecting member 54. In some cases a permanent magnet 60 may be placed between the auxiliary magnetic pole 52 and the connecting member 54 to magnetically connect the auxiliary magnetic pole 52 with the principal magnetic pole 51.

In the above-described magnetic heads of different structures, the magnetic line of force due to the magnetomotive force imparted to the auxiliary magnetic pole 52 concentrates on the point b at the highly permeable magnetic layer 58 in the vicinity of the principal magnetic pole, and then is converged on the point a at the distal end of the principal magnetic pole 51, thereby reversing the magnetization in the perpendicularly magnetizable recording layer 57.

When the abovementioned recording system is adopted, the recording density remarkably improves in comparison with the conventional longitudinal recording system, because the diamagnetic field due to existence of the magnetization becomes closer to zero as the recording density becomes higher.

Even with such perpendicular magnetic recording system as described in the foregoing, there still remain several defects, to name, for example:

(1) When the magnetomotive force is imparted by the winding 55 of the auxiliary magnetic pole 52, inductance increases to deteriorate the frequency characteristics;

(2) In case a permanent magnet is used for the auxiliary magnetic pole, the number of turns of the winding 56 on the principal magnetic pole cannot be increased, hence large current becomes necessary;

(3) In reproducing the recorded information by the winding provided around the principal magnetic pole, the output obtained is small, which makes it difficult to process the reproduction signals;

(4) When the permanent magnet is inserted between the auxiliary magnetic pole and the connecting member as shown in FIG. 9C, efficiency in writing and reproduction decreases due to the permanent magnet being thick, whereby the advantages of the perpendicular magnetic recording system cannot be made much use of; and (5) When the permanent magnet to be incorporated in the auxiliary magnetic pole is to be made as thin as possible, difficulty arises in forming it properly. Hence the manufacturing cost remarkably increases.

The abovementioned problems will hereinafter be called "Problem E".

Type F

Problem A as already explained with reference to FIG. 1 can be solved by a construction of the magnetic recording device shown in FIG. 11. In the following, explanations will be given as to new problems that derive from such construction.

In FIG. 1, the principal magnetic pole 1 is made of a thin film of highly permeable magnetic material such as permalloy, etc. in a thickness of 1 $\mu$m or so, and the auxiliary magnetic pole 2 has the winding 3 wound around it for imparting magnetomotive force necessary for reversing the magnetization in the recording medium. For the auxiliary magnetic pole, MnZn-ferrite is widely used as the highly permeable magnetic material. The recording medium 4 is composed of the perpendicularly magnetizable magnetic recording layer 5 having a thickness of 0.5 to 2 $\mu$m or so and a readily magnetizable axis in the vertical direction (y-direction), and consisting of, for example, Co-Cr alloy; the highly permeable magnetic layer 6 of 0.5 to 1 $\mu$m thick and made of a thin film of 80% Ni-permalloy; and the substrate 7 to support these two layers thereon. The double-layered structure of these two magnetic layers 5, 6 is indispensable for attaining high density recording in this perpendicular type magnetic recording system.

FIG. 11 illustrates the perpendicular type recording magnetic head according to the present invention, when multi-track recording is intended by use of a plurality of principal magnetic poles, and the following explanations are devoted to the problems that arise with such device construction.

In FIG. 11, the principal magnetic pole winding 80 is wound around each of a plurality of principal magnetic poles 1. By the electric conduction in each winding, the magnetic line of force to generate in the auxiliary magnetic pole 2 is dispersed or absorbed to perform the magnetic recording on the recording medium 4. The magnetic recording in this instance is done by magnetically saturating the distal end part of the principal magnetic pole by electric conduction through the winding or, depriving the magnetic pole of its magnetic property with heat, or adding the magnetic field to some extent to the magnetic pole. These plurality of principal magnetic poles 1 and the windings 80 therefor are formed by the photolithographic technique known in the field of IC manufacturing on a substrate 72 for the principal magnetic pole. In this construction, the magnetomotive force required for reversing the magnetization in the recording medium is imparted by the current flowing in the winding on the auxiliary magnetic pole capable of accommodating a large number of winding turns, hence the principal magnetic pole winding requires only that the current be great enough for initiating the reversal of the magnetization, so that the number of winding turns on the principal magnetic pole may be small. On account of this, the photolithographic technique is readily applicable for fabricating the principal magnetic pole winding, which facilitates realization of the multi-tracked construction. Further, since the inductance is small, the device is excellent in its high frequency characteristics.

In spite of the afore-described various points of advantage, the magnetic head is still not free from the undermentioned disadvantages.

(1) When the abovementioned multi-track head construction is used, it becomes necessary to provide terminals for the principal magnetic pole windings in number corresponding to the number of the principal magnetic poles. Accordingly, the number of circuits incidental to all of the principal magnetic poles will consequently increase along with the number of terminals. Therefore, the volume of the entire device will increase.

(2) A narrow guard band due to the multi-track head construction causes increase in cross-talk, resulting in problems such as peak-shift, etc. On the other hand, a wide guard band lowers the recording density.

(3) In the device construction as shown in FIG. 11, since the principal magnetic pole and the auxiliary magnetic pole are not magnetically connected, the writing efficiency is poor.

The abovementioned problems will hereinafter be called "Problem F".

The present invention is directed to solving these problems A through F inherent in the conventionally known perpendicular type magnetic recording system.

SUMMARY OF THE INVENTION

It is therefore the primary object of the present invention to provide a perpendicular type magnetic head suited for realizing the multi-track construction for high recording density as well as low power consumption.

It is the secondary object of the present invention to provide a perpendicular type magnetic head capable of producing high reproduction output and reducing influence of the spacing loss.

It is the third object of the present invention to provide a perpendicular type magnetic head capable of realizing reduction in the fringe effect noise and smoothness in running of the magnetic recording medium.

It is the fourth object of the present invention to provide a perpendicular type magnetic head capable of reducing the number of component parts for size reduction of the entire device, and remarkably improving the writing efficiency.

It is the fifth object of the present invention to provide a perpendicular type magnetic head capable of simplifying the manufacturing steps and realizing improvement in the wear-resistant property of the magnetic pole.

It is the sixth object of the present invention to provide a perpendicular type magnetic head which attempts to reduce the number of winding turns in the magnetic pole winding, to prevent undesirable cross-talk from occurring, and to improve the recording density and the recording efficiency.

BRIEF DESCRIPTION OF THE DRAWINGS

In the drawing:

FIGS. 1 through 9C illustrate various conventional magnetic head of the constructions having the problems A through F, wherein FIG. 1 is a partially enlarged, cross-sectional plan view of the magnetic head construction related to the problems A and F; FIG. 2 is a schematic structural diagram of the perpendicular magnetic recording device; FIG. 3 is a perspective view of the perpendicular magnetic recording and reproducing device; and FIG. 4 is a cross-sectional view showing a state of magnetization;

FIGS. 5 and 6 schematically illustrate structures of the perpendicular magnetic recording and reproducing device related to the problem C;

FIG. 7 is a schematic construction of the perpendicular magnetic recording and reproducing device related to the problem D;

FIG. 8 is a graphical representation showing a hysteresis loop for explaining the state of the recorded information on the recording medium;

FIGS. 9A to 9C are schematic diagrams showing different constructions of the perpendicular magnetic recording and reproducing devices related to the problem E; and FIGS. 10 to 33 illustrate the perpendicular magnetic head of various constructions according to this invention which solve the problems A through F: wherein FIGS. 10 to 13 relate to the problem A, FIG. 10 being a cross-sectional plan view for explanation of one embodiment of the present invention, FIG. 11 being a perspective view for explanation of another embodiment of the present invention, and FIGS. 12 and 13 being respectively cross-sectional plan views showing other embodiments of the present invention; FIGS. 14 to 18 relate to the problem B, FIGS. 14 and 15 being respectively a plan view and a perspective view for explanation of one embodiment of the present invention, FIG. 16 being diagram for explaining generation of leakage magnetic flux, and FIGS. 17 and 18 being respectively plan views showing other embodiments of the present invention; FIGS. 19 to 23 relate to the problem C. FIG. 19 being a schematic structural diagram to explain one embodiment of the present invention, FIG. 20 being a perspective view for explanation of another embodiment of the present invention, and FIGS. 21 to 23 being respectively cross-sectional views for explanation of other embodiments of the present invention, each figure being a longitudinal cross-section of an auxiliary magnetic pole; FIGS. 24 to 27 relate to the problem D, FIG. 24 being a schematic structural diagram showing one embodiment of the present invention, FIGS. 25A to 25D and FIGS. 26A and 26B being respectively schematic structural diagrams showing other embodiments of the present invention, and FIG. 27 being a front view for explanation of an azimuth angle given to a ridge line on the magnetic pole; FIG. 28 is a schematic structural diagram for explanation of one embodiment of the present invention related to the problem E; and FIGS. 29 to 33 relate to the problem F.

DETAILED DESCRIPTION OF PREFERRED EMBODIMENTS

In the following, the present invention will be described in detail with reference to actual embodiments thereof shown in the accompanying drawing.

Figure 1:
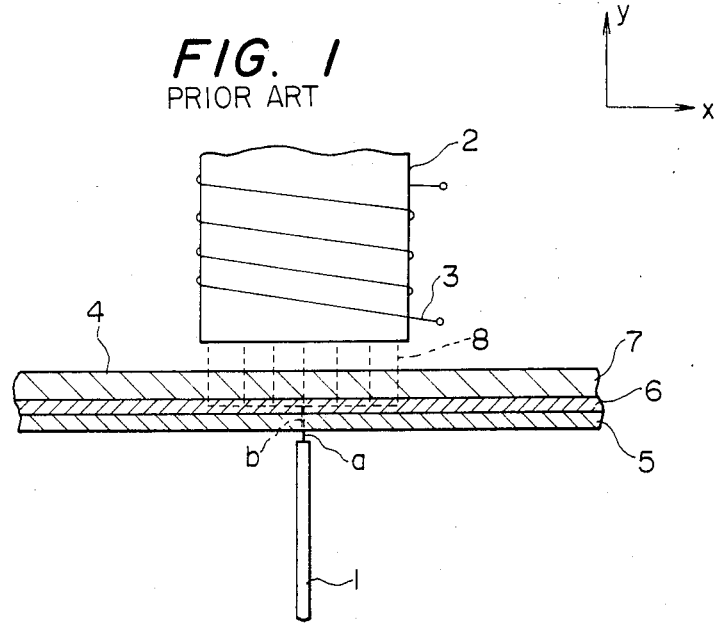
Figure 10:
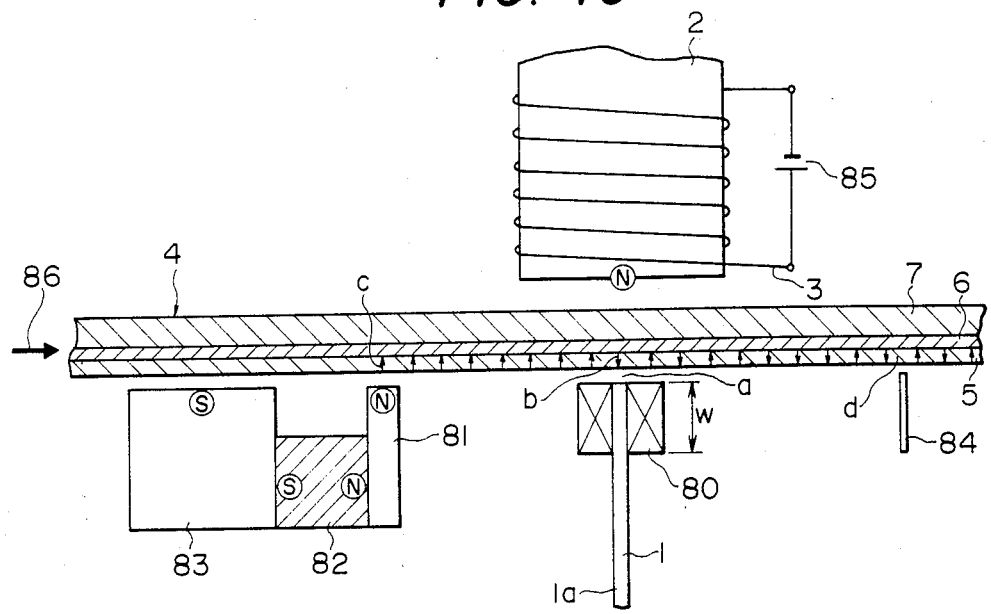

FIG. 10 illustrates one embodiment of the perpendicular magnetic head according to the present invention for solving the problem A, in which those parts which are identical with those in FIG. 1 are designated by the same reference numerals, and explanations for them are dispensed with.

In this embodiment, the principal magnetic pole winding 80 is wound around the principal magnetic pole 1 to a width W. This principal magnetic pole winding 80 is formed by use of techniques such as the photolithography, etc. known in the technical field of manufacturing integrated circuits (IC). A reference numeral 81 designates the erasing magnetic pole which is made of a soft magnetic material, and has a function of magnetizing the perpendicularly magnetizable recording layer 5 in a certain definite direction. A permanent magnet 82 is mounted on the base part of this erasing magnetic pole 81 so as to impart to the erasing magnetic pole 81 the required magnetomotive force. In the illustrated embodiment, the N-pole is on the side of the erasing magnetic pole 81, and the S-pole is on the other side. An auxiliary yoke 83 made of a soft magnetic material is provided in contact with the permanent magnet 82, which serves to improve efficiency of the erasing magnetic pole 81.

On the opposite side of the erasing magnetic pole 81 beyond the principal magnetic pole 1, i.e., at the exit side of the magnetic recording medium 4, there is disposed the magneto-resistive element (MR element) 84 for obtaining the reproduction output. A numeral 85 refers to a power source for passing a certain definite current through the auxiliary magnetic pole winding 3, and a reference numeral 86 designates a travelling direction of the magnetic recording medium 4.

In the following explanations will be given as to the recording and reproducing processes in the construction of this embodiment as described in the foregoing.

Since the distal end of the erasing magnetic pole 81 assumes the N-pole, the perpendicularly magnetizable recording layer 5 is subjected to upward magnetization as shown in the drawing at the point c opposite the erasing magnetic pole 81 and thereafter, irrespective of the previous hysteresis. Subsequently, current is supplied to the auxiliary magnetic pole winding 3 in the reverse direction to the erasing magnetic pole 81 in the vicinity of the point b, in a quantity sufficient to enable the magnetization in the perpendicularly magnetizable recording layer 5 to be reversed. In the illustrated embodiment, the N-pole is on the distal end of the auxiliary magnetic pole 2.

In this state, if no operation at all is done on the principal magnetic pole 1, the magnetization in the perpendicularly magnetizable recording layer 5 is reversed in the opposite direction to that assumed so far at a portion in the vicinity of the point b, and the reversed magnetization moves toward the MR element 84 as the reproducing head. However, the principal magnetic pole 1 has the principal magnetic pole winding 80 wound therearound, in which current flows or stops in accordance with control signals. At an instant of no current flow, there occurs reversal of magnetization in the vicinity of the point b due to the magnetomotive force of the auxiliary magnetic pole 2. However, while the current is flowing, at the distal end and in its vicinity, the principal magnetic pole 1 is magnetically saturated, owing to which the magnetic line of force generated from the auxiliary magnetic pole 2 does not concentrate on this portion, hence no reversal of the magnetization takes place. In other words, the state of magnetic erasure is maintained.

When the recording operation is performed with such recording system, the winding current required for magnetically saturating the point a in the vicinity of the distal end of the principal magnetic pole 1 takes an extremely small value. In practice, the current will be sufficient with 20 mA in case the principal magnetic pole winding 80 is a single turn with a width W of 20 $\mu$m.

The system of performing the perpendicular magnetic recording by energizing the auxiliary magnetic pole as described above has heretofore been contemplated and experimented with as the system of directly energizing the principal magnetic pole. According to such system, however, it was not possible to cause signals to remain in the recording medium by the magnetic saturation of the energized portion of the principal magnetic pole at the time of recording a shortwave signal of 1 $\mu$m or so.

Figure 8:
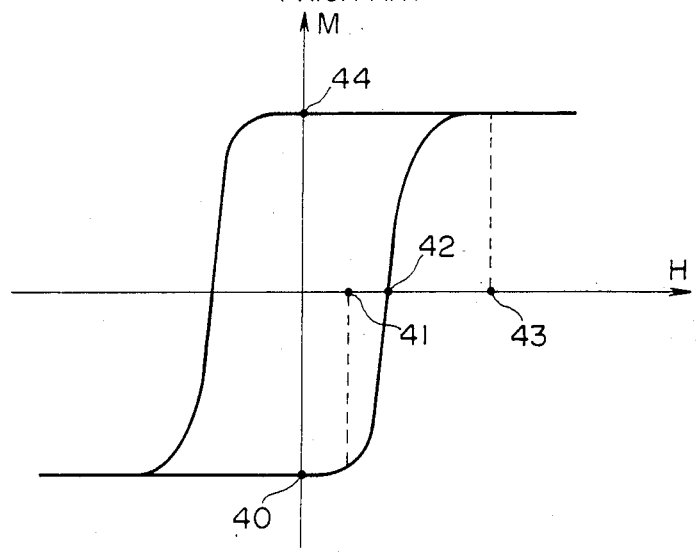

In the following, explanations will be given using FIG. 8 as to the hysteresis curve in the perpendicular direction of the perpendicularly magnetizable recording layer 5. After the recording layer 5 passes by the point c shown in FIG. 10, the state of magnetization is as shown at the point 40 in the hysteresis curve. When the layer 5 reaches the point b, and if the principal magnetic pole winding is not electrically conducted, the magnetic field as at the point 43 is only applied to the layer 5, while it is brought to the magnetized condition as at the point 44 when the layer moves from the point b to the point d.

However, when there is a current supply in the principal magnetic pole winding 80 at the point b, the recording layer only receives the magnetic field as at the point 41, hence it remains in the magnetic state as shown at the point 40 in the hysteresis curve when it has reached the point d.

In the foregoing explanations, the energization is done on the assumption that a magnetic field sufficient for reversal of the magnetization is generated in the auxiliary magnetic pole. Besides this, the following operations may also be contemplated.

One of such operations is that the magnetic field as shown at the point 41 is applied to auxiliary magnetic pole 2, and the applied magnetic field is then raised in the principal magnetic field up to the magnetic field reversing point 43.

Another operation is that the magnetic field is imparted to the auxiliary magnetic pole 2 to the point 42, i.e., to a level corresponding to the coercive force of the perpendicularly magnetizable recording medium, and then the magnetic field is caused to change by the principal magnetic pole winding from the point 43 to the point 41 to thereby perform the recording.

However, these two operations as mentioned above only utilize the principal magnetic pole winding 80 as a gate for the magnetic field to generate from the auxiliary magnetic pole, in other words, since these operations neglect the fact that the principal magnetic pole tends to cause magnetic saturation by the current flowing through the principal magnetic pole winding, the efficiency in the recording operation would inevitably decrease. Therefore, the operating system of the embodiment as shown in FIG. 10 is more advantageous.

As explained in the foregoing, even when the principal magnetic pole winding 80 has only a single winding turn on it, the magnetic recording can be done with a low current, hence the multi-track head construction can be readily realized from the standpoints of both device structure and electric current flow. In this instance, a single auxiliary magnetic pole 2 may be provided, the number of winding turns of which may be arbitrarily selected.

Figure 11:
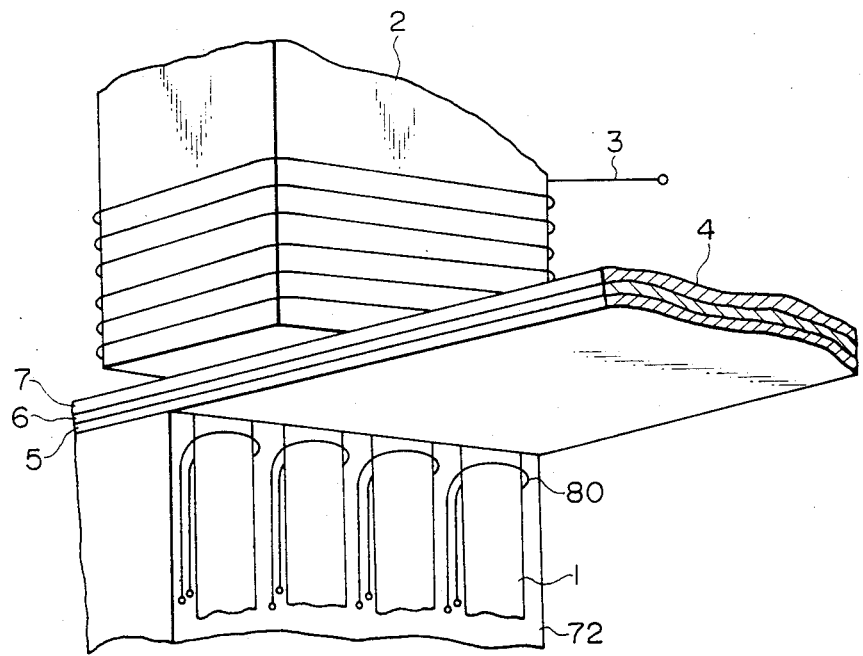

FIG. 11 illustrates an example, in which the multi-track head construction is realized by causing a multitude of principal magnetic poles to face to a single auxiliary magnetic pole 2.

Reproduction of the recorded informations in this multi-track structure cannot be done by utilizing the auxiliary magnetic pole winding. Therefore, if the MR element suitable for reproduction of the perpendicularly magnetizable recording layer is used, it can be readily adapted for reproduction in such multi-tracked construction.

In explaining this basic principle, there has been a system in accordance with one embodiment, wherein the magnetic recording is done by magnetically saturating the principal magnetic pole at its distal end and in the vicinity thereof to inhibit the magnetic recording. However, when the principal magnetic pole is relatively thick of an order of 10 $\mu$m or so, the magnetic recording may be done by making the point a of the principal magnetic pole winding to be of the same polarity as that of the distal end of the auxiliary magnetic pole 2. The same effect can be expected by depriving the principal magnetic pole of its magnetic property by heating the same to a temperature level higher than the Curie temperature, the heat being caused by the current flow in the principal magnetic pole winding.

Furthermore, any of the abovementioned operations may be appropriately combined, as follows: (1) the principal magnetic pole 1 is magnetically saturated; (2) the distal end of the principal magnetic pole is rendered the same polarity as that of the auxiliary magnetic pole; and (3) the magnetic pole is deprived of its magnetism by heat of current flow.

On the other hand, in order to obtain a writing head having excellent magnetic recording efficiency, it is preferable that the tale portion 1a of the principal magnetic pole 1 and the auxiliary magnetic pole 2 be magnetically connected. While this system becomes practicable by combining both together with a soft magnetic permalloy, such magnetic connection is facilitated by disposing both principal and auxiliary magnetic poles on one and the same side with respect to the recording medium.

FIG. 12 shows one embodiment adopting such construction as mentioned above. It should be noted that, in the illustrated construction, the magnetic recording medium is omitted, and those parts identical with those in FIGS. 10 and 11 are designated by the same reference numerals. In the drawing, a reference numeral 87 designates the auxiliary magnetic pole, and a numeral 88 refers to a connecting part to connect the principal magnetic pole 1 with the auxiliary magnetic pole 87, all being shown as assembled into a single head together with an erasing magnetic pole.

When adopting the structure as shown in FIG. 12, since the auxiliary magnetic pole 87 and the principal magnetic pole 1 are magnetically connected, a large magnetomotive force is obtained in the vicinity of the point b in FIG. 10, even if the current flowing through the auxiliary magnetic pole winding 3 is small in amount, whereby the writing efficiency by the principal magnetic pole winding 80 is also improved. The important point to be noted in designing this type of magnetic head is that, since the erasing magnetic pole 81, the auxiliary magnetic pole 2, and the principal magnetic pole 1 should be in simultaneous contact with the magnetic recording medium, the sliding surface 89 of the recording medium is required to have a curvature adapted thereto, and that the width W of the principal magnetic pole winding 80 should not be too short. Practical curvature of the sliding surface may be realized with a radius of from 3 to 20 mm. The curvature may vary from place to place. The width W of the principal magnetic pole winding 80 should be such that it be made longer than the longest wavelength of a signal for recording to be formed along the running direction of the magnetic recording medium. Accordingly, in consideration of the working precision and the longest wavelength to be recorded, the width W of the winding 80 should preferably be made 20 $\mu$m or so. In this instance, the number of winding turns of the winding may be increased to such an extent that is possible to realize the multi-track head construction, in which the inductance in no way causes problems within its practical extent.

FIG. 13 illustrates a further embodiment of the present invention, wherein improvement is given to the auxiliary magnetic pole 2. In the drawing, the permanent magnet 90 is fixed at the distal end of the auxiliary magnetic pole 2. If further necessary from the standpoint of working, etc., a yoke 91 may be provided on the outer surface of the permanent magnet 90.

Suitable materials for the permanent magnet 90, in case the auxiliary magnetic pole 2 is separated from the principal magnetic pole, may be selected from the group of Ba-ferrite, Sr-ferrite, $SmCo_5$, and so forth. In case the magnetic connection as shown in FIG. 12 is possible, a magnet of alnico (aluminum-nickel-cobalt) series alloy is preferred.

In the above-described embodiment of FIG. 13, there is adopted a system of composing a portion due to current supplied to the winding 3 for obtaining the magnetomotive force and the magnetomotive force due to the permanent magnet. This arrangement is to correct any irregularity in the coercive force in the magnetic recording medium with the magnetomotive force due to the electric current. If there is no necessity for such correction, the entire magnetomotive force required may be obtained from the permanent magnet.

As is clear from the foregoing explanations, the present invention has made it possible to perform a highly efficient perpendicular magnetic recording by flowing a small quantity of current through the winding wound around the principal magnetic pole in such a manner that the magnetic recording medium is magnetized in a certain definite direction by the erasing magnetic pole to realize the state of the magnetic erasure, and then the magnetomotive force sufficient to enable the perpendicular magnetic recording is imparted to the auxiliary magnetic pole. The material effects that result from the present invention are as follows.

(1) Power consumption becomes less than that for the conventional device construction by 1/10 to 1/1000.

(2) The number of winding turns of the principal magnetic pole winding, into which a signal input is introduced is as small as 1 to 10 turns, which improves the high frequency characteristic of the magnetic head with small inductance.

(3) For the same reason as above, the resonant frequency of the device becomes high.

(4) The multi-track head construction can be readily realized for the abovementioned items (1) and (2).

In this way, the Problem A can be solved. It is to be noted that, in each of the following embodiments, the magnetic recording medium is magnetized in advance in a certain definite direction to control the reversal in the magnetization.

Figure 2:
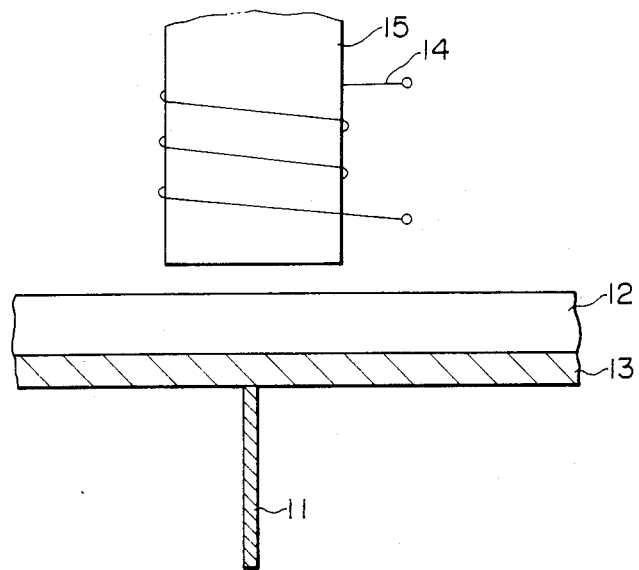
Figure 3:
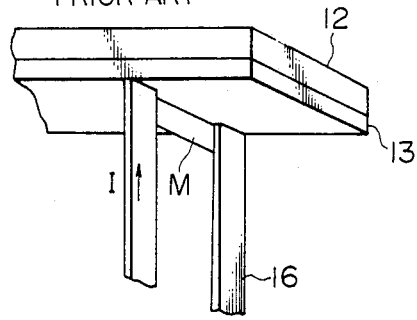
Figure 4:
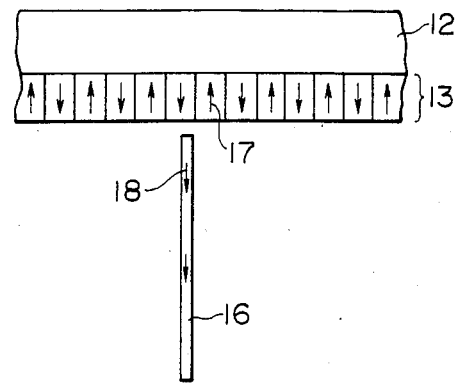
Figure 14:
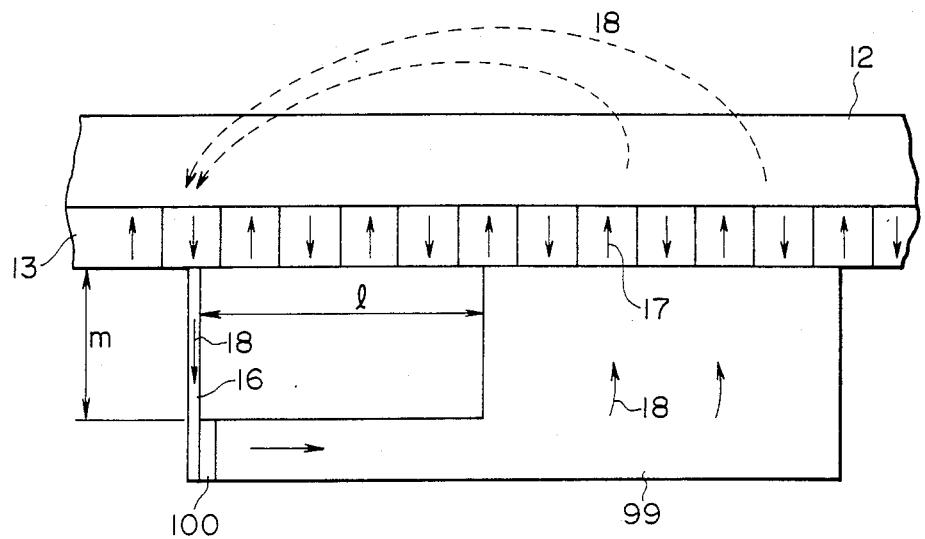
Figure 15:
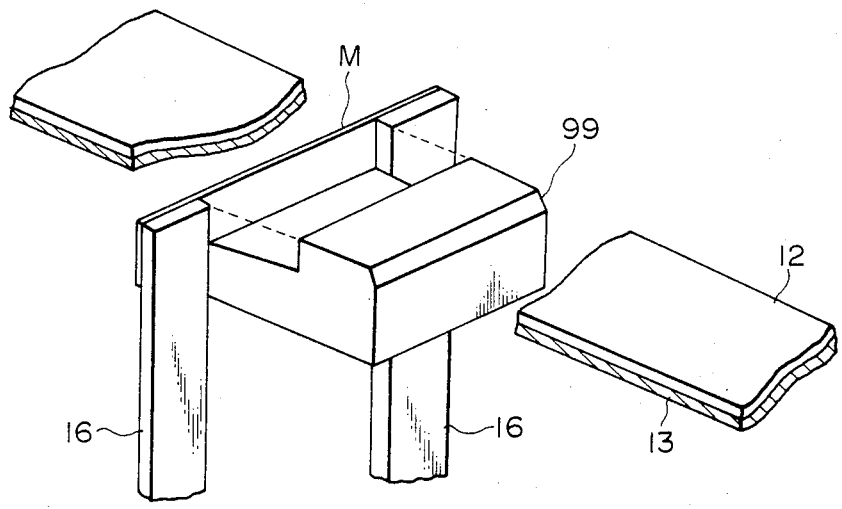

FIGS. 14 and 15 illustrate one embodiment of the present invention for solving Problem B, in which those parts identical with, or corresponding to, those in FIGS. 2 to 4 are designated by the same reference numerals, and the explanations thereof are dispensed with.

In the drawing, a reference numeral 99 designates an auxiliary yoke which is made of a highly permeable magnetic material, and functions to draw the magnetic flux 18. The auxiliary yoke 99 confronts to magnetic layer 13 with a relatively wide area, one end of which is connected with electrodes 16 of the MR element through an insulating layer 100.

The MR element M is made of a thin film (200 to 1000Å) of alloy such as Ni-Fe, Ni-Co, or the like, both ends of which are connected with the electrodes 16. The MR element opposes the magnetic layer 13 as shown in FIG. 3. The material for the auxiliary yoke 99 may be selected from any of the highly permeable magnetic material such as permalloy, ferrite, etc.

The insulating layer 100 electrically insulates the electrodes 16 and the auxiliary yoke 99. If the proper resistance value of the auxiliary yoke 99 is sufficiently large, this insulating layer 100 may be dispensed with.

Figure 16:
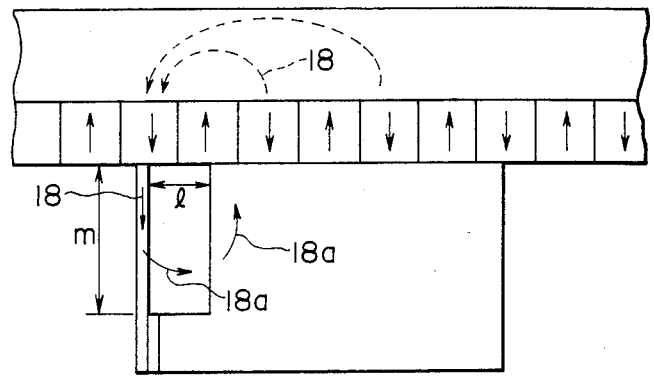

A distance l of the gap between the MR element M and the auxiliary yoke 99 is so set that it may be in a relationship of $l>m$ with respect to a depth m from the surface of the magnetic layer 13 to a connection between the auxiliary yoke 99 and the electrodes 16. When this relationship is reversed, i.e., $l<m$, as shown in FIG. 16, there occurs a leakage magnetic flux 18a.

The construction in FIGS. 14 and 15 constitutes a closed magnetic circuit, wherein the magnetic flux generated from the magnetic layer 13 passes through the MR element M, the electrode 16, and the auxiliary yoke 99, and returns to the magnetic layer 13. The construction is therefore capable of providing satisfactory pull-in of the magnetic flux, increasing the reproduction output, and reducing the spacing loss, hence a stable reproduction output can be obtained.

Figure 17:
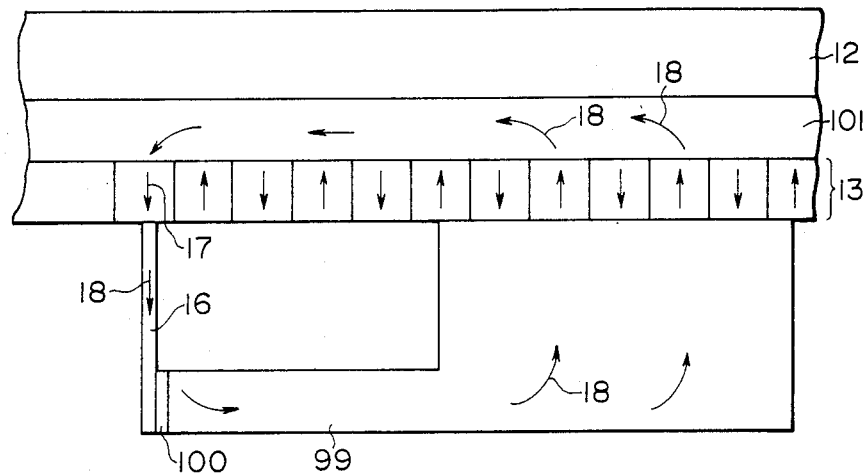

On the other hand, there has recently been developed a recording medium having as the magnetic layer a double-layer structure suitable for the perpendicular magnetic recording. This double-layer structure is such that the conventional Co-Cr single layer is lined with a highly permeable permalloy film. FIG. 17 shows the flow of magnetic flux in such magnetic recording medium. As shown, the magnetic flux 18 passes through the permalloy layer 101, and returns to the MR element M. In this case, since the magnetic flux passes through the permalloy layer 101, its magnetic resistance becomes less than that of the embodiment shown in FIG. 14.

Figure 18:
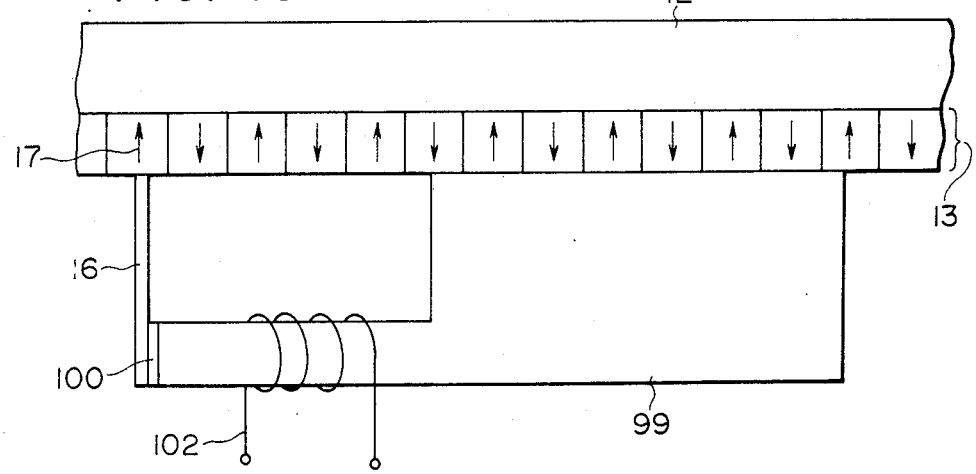

Incidentally, application of the bias magnetic field is required in most cases for improving the non-linearity of the MR element to the magnetic field. In such cases, a winding 102 is provided on the auxiliary yoke 99 as shown in FIG. 18, through which a d.c. current is conducted (a.c. current may also be used), thereby imparting the bias magnetic field.

Even when the MR element and the auxiliary yoke 99 are oppositely arranged with the magnetic recording medium being interposed between them, the closed magnetic circuit can be formed, provided that the auxiliary yoke 99 and the MR element M are magnetically coupled, avoiding the magnetic recording medium, whereby the same effect as in the above-described embodiment can be obtained.

In the foregoing, explanations have been given as to a case where the perpendicular magnetic recording system alone is adopted. Even in case of adopting the longitudinal magnetic recording system, it is possible to obtain a large, stable reproduction output with a reduced spacing loss, provided that the closed magnetic circuit is constructed with the MR element and the auxiliary yoke.

As is apparent from the foregoing explanations, the present invention makes it possible to provide a magnetic head for reproduction capable of forming the closed magnetic circuit through the magnetic recording medium, having good pulling action of the magnetic flux, capable of increasing the reproduction output, and of obtaining a stable reproduction output with reduced spacing loss, because it adopts such a construction that the magneto-resistive (MR) element and the auxiliary yoke are provided in opposition to the magnetic recording medium, the auxiliary yoke facing the magnetic recording medium with a relatively wide area, both of which are magnetically coupled. By this construction, the Problem B is solved.

Figure 5:
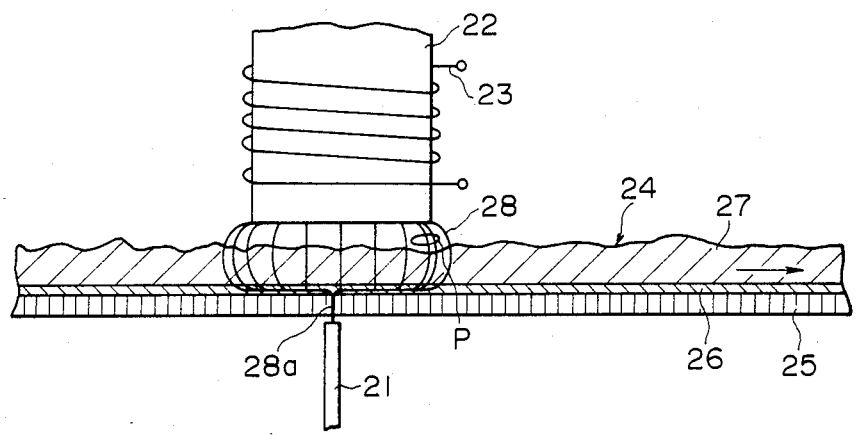
Figure 6:
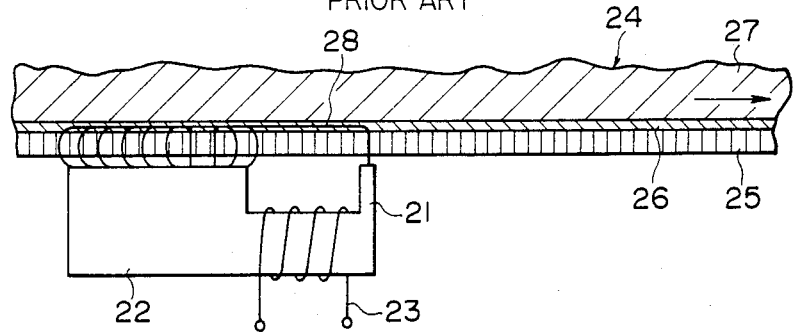

FIGS. 19 to 23 respectively indicate different embodiments of the present invention to solve the Problem C. In the drawing, those parts which are identical with, or correspond to, those parts in FIGS. 5 and 6 are designated by the same reference numerals, and the explanations thereof are dispensed with.

Figure 19:
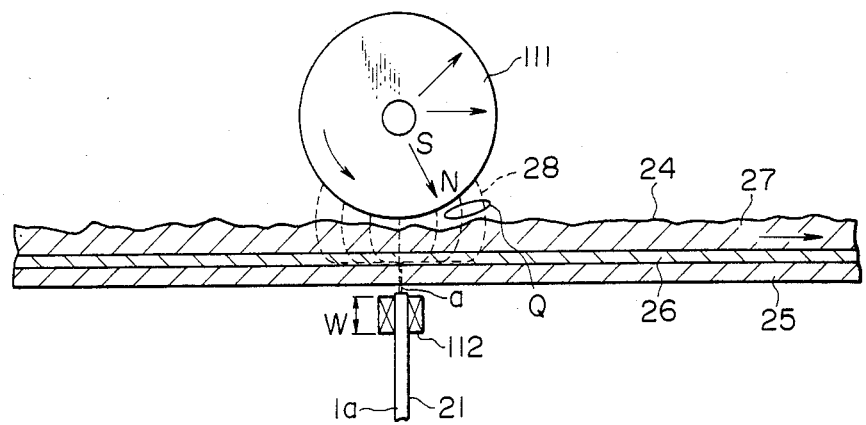

In the embodiment shown in FIG. 19, the auxiliary magnetic pole 111 is made of a permanent magnet in a generally cylindrical form with the peripheral surface side thereof being magnetized as the N-pole, while the center part is the S-pole. The winding 112 is provided around the distal end of the principal magnetic pole 21 with a width W.

In this construction, when the magnetic recording medium 24 enters between the principal magnetic pole 21 and the auxiliary magnetic pole 111 in such a state that the side of the perpendicularly magnetizable recording layer 25 faces the side of the principal magnetic pole 21, while the outer surface side of the recording layer 25 is erased by direct current to be rendered as the S-pole, there occurs the magnetic flux 28 between the auxiliary magnetic pole 111 and the principal magnetic pole 21 due to the N-pole on the peripheral surface of the auxiliary magnetic pole, if no current is being conducted through the winding 112 of the principal magnetic pole 21, whereby the state of magnetization is reversed, i.e., the S-pole turns to the N-pole.

On the other hand, when the current is supplied to the winding 112 of the principal magnetic pole 21 to an extent such that the N-pole occurs at the point a at the distal end of the principal magnetic pole 21, the point a and its neighborhood portion is promptly saturated magnetically, and no magnetic flux 28 is generated nor does the reversed magnetization occurs, hence the perpendicularly magnetizable recording layer 25 remains in the S-pole. As a consequence of this, the magnetic recording can be effected in accordance with the signal current to be supplied to the winding 112.

The current required for magnetically saturating the point a at the distal end of the principal magnetic pole 21 can be extremely small in quantity. For example, when the winding 112 of the principal magnetic pole 21 is formed in a multi-structure by the technique of photolithography with one winding turn and with its width W being 20 μm, the current would be sufficient at 20 mA.

In addition, since the auxiliary magnetic pole 111 is in a cylindrical shape, the magnetic recording medium 24 can be forwarded with its rear surface being in contact with the cylindrical magnetic pole supported on a shaft in a freely rotatable manner. Also, even if the rear surface of the magnetic recording medium 24 is remarkably rough, it can be forwarded smoothly in a state with the rear surface thereof being in contact with the auxiliary magnetic pole 111.

When the cylindrical auxiliary magnetic pole 111 is used, there does not occur the so-called fringe effect noise, wherein the magnetic flux 28 abnormally concentrates on the end part of the auxiliary magnetic pole 22 to record noise, as shown by a reference letter P in FIG. 5 for the conventional device construction, whereby the flux 28 can be dispersed uniformly as shown by a reference letter Q in FIG. 19 and is forwarded to the magnetic recording medium 24.

Figure 20:
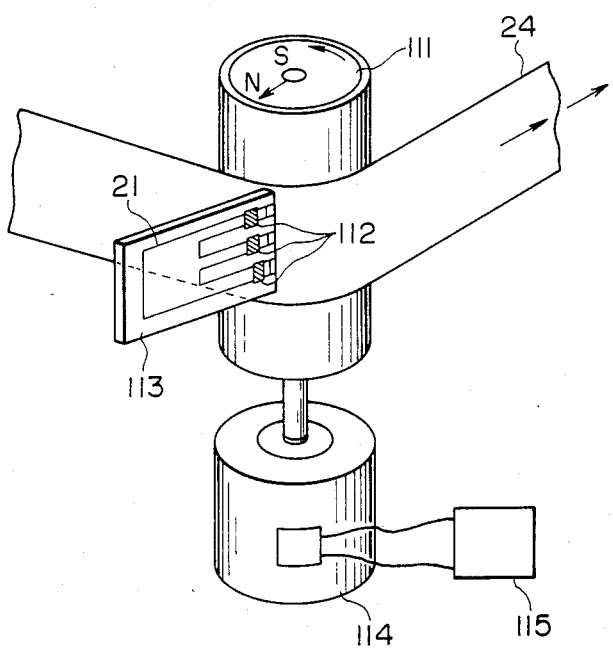

FIG. 20 illustrates another embodiment of the present invention, in which the principal magnetic pole 21 is shown as the multi-track structure. In the drawing, a reference numeral 113 designates a substrate, on which the principal magnetic pole 21 is formed, a numeral 114 refers to a motor for rotating the auxiliary magnetic pole 111, and a numeral 115 designates a power source. When constructing the principal magnetic pole 21 in the multi-track structure, the number of winding turns of the windings 112 can be small, which serves for reduction in the power consumption, and facilitates realization of the multi-track construction of the magnetic pole. When the auxiliary magnetic pole 111 is made of a material having a large frictional coefficient such as, for example, a rubber magnet, the magnetic pole can also be utilized as a pinch roller.

Figure 21:
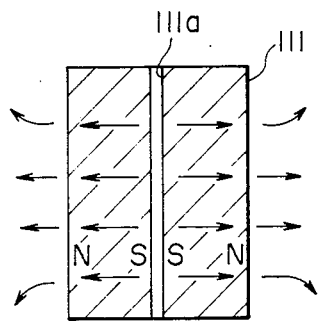

FIG. 21 shows a longitudinal cross-section of the auxiliary magnetic pole 111 having a center hole 111a. It is understood that the magnetic pole 111 is magnetized with the S-pole on the side of its center hole 111a, while the external surface side thereof is the N-pole. For the material constituting the auxiliary magnetic pole, Ba-ferrite, etc. may be used.

Figure 22:
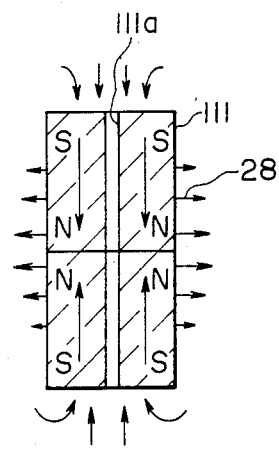

In the embodiment shown in FIG. 22, the cylindrical magnetic pole 111 is divided into two portions in its axial direction, and these divided magnetic pole portions are butt-connected so that their meeting surfaces are in the same polarity. This structure is advantageous when the magnetic recording and reproducing apparatus has ample space in its upper and lower direction. For the material to make this magnetic pole, there may be used alnico magnet material, etc.

Figure 23:
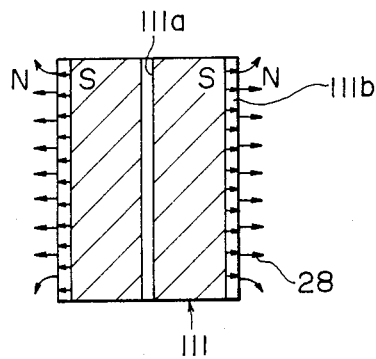

FIG. 23 shows further embodiment of the present invention, wherein a thin film magnet 111b of samarium-cobalt alloy, etc. is provided on the outer periphery of the cylindrical base member, the outer surface side of the magnet layer being magnetized as the N-pole, and the inner peripheral surface thereof as the S-pole. With such construction, the same effect as in the foregoing constructions can also be obtained.

In the foregoing, explanations have been given as to the embodiments of the device which are applied to only the magnetic head to perform the magnetic recording, although the invention is not limited to such embodiments, but can be applied to the erasing magnetic pole to arrange the magnetization in the magnetic recording medium in a certain definite direction.

As is apparent from the foregoing explanations, the present invention provides a magnetic head which is simple in construction, excellent in its high frequency characteristic, operable with a reduced power consumption, can be easily realized as a multi-track structure, is capable of reducing fringe-effect noise, and of performing smooth running of the magnetic recording medium, because it adopts such a construction that at least one of the magnetic heads for the perpendicular magnetic recording composed of the principal magnetic pole and the auxiliary magnetic pole is constructed with a permanent magnet, and further the magnetic pole composed of the permanent magnet is shaped in a cylindrical form. Thus, the Problem C can be solved.

Figure 7:
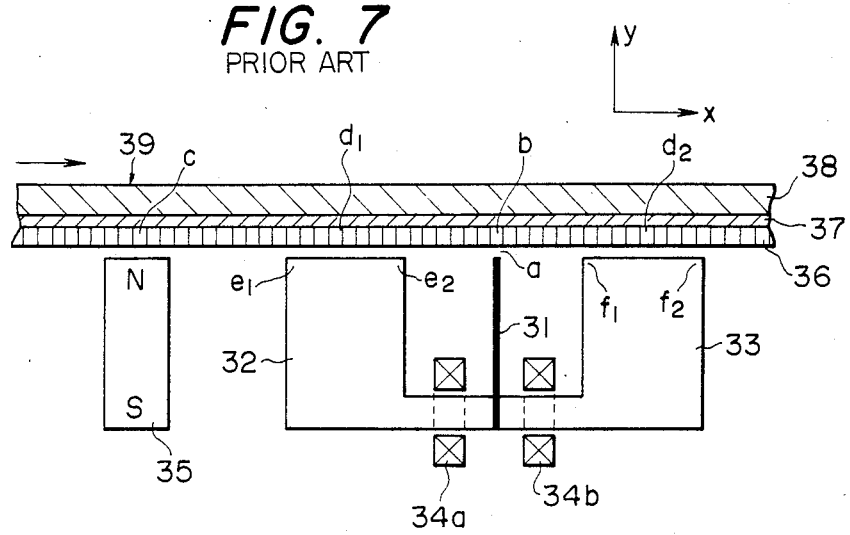

FIGS. 24 to 27 illustrate various embodiments of the present invention for solving Problem D. In the drawing, those parts identical with, or corresponding to, those in FIG. 7 are designated by the same reference numerals, and the explanations thereof will be dispensed with.

Figure 24:
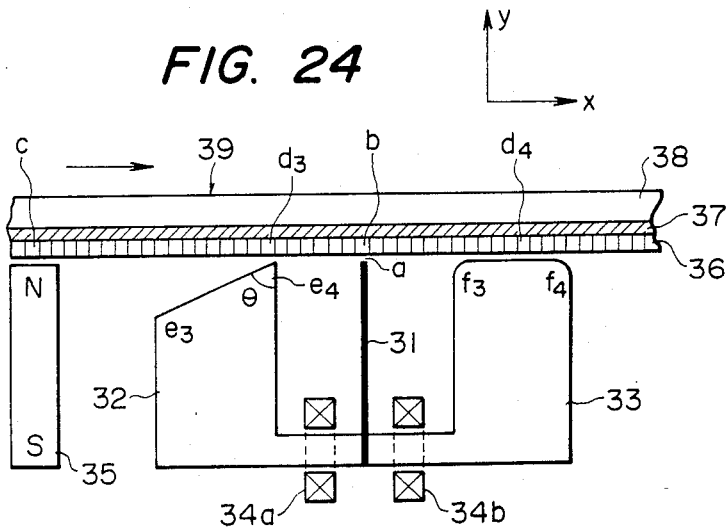

In the embodiment shown in FIG. 24, the surface of the first auxiliary magnetic pole 32, on and along which the magnetic recording medium slides, is formed in inclination with respect to the recording medium, and is not in parallel therewith, in which a corner part $e_4$ has an angle which is smaller than 90 degrees.

On the other hand, the corner parts $f_3$, $f_4$ of the second auxiliary magnetic pole 33 are rounded to avoid concentration of the magnetic line of force thereon. This rounded or curved surface form may be one that follows any of the functions such as the quadratic function, exponential function, logarithmic function, etc. Any way, it can be a curved surface which gradually separates from the travelling recording medium.

In the following, explanations will be given as to the recording operations of this embodimental construction.

Direct current is supplied in advance in the windings 34a, 34b for generating the bias magnetic field. The magnetic lines of force generated in the windings 34a and 34b respectively pass through the first auxiliary magnetic pole 32 and the second auxiliary magnetic pole 33 to reach the highly permeable magnetic layer 37, and then, passing through this magnetic layer 37, they further pass through the point b opposite the principal magnetic pole 31 and the point a at the distal end of the principal magnetic pole, thereby forming a closed loop.

In this case, the magnetic field intensity reaches its maximum at a point $d_3$ in the vicinity of the angled part $e_4$ of the first auxiliary magnetic pole 32, whereby the reversal of the magnetization in the perpendicularly magnetizable recording layer 36 becomes feasible.

Since the principal magnetic pole 31 is extremely thin, it has a high magnetic resistance. Therefore, in the neighborhood of the point b, the magnetic field intensity slightly lowers which is as strong as the bias magnetic field intensity for reversing the magnetization in the perpendicularly magnetizable recording layer 36. Further, at a point $d_4$ opposite the second auxiliary magnetic pole 33, there exists no magnetic flux concentration, hence the magnetic field intensity at this position is extremely low, and the recorded magnetization is not eliminated.

Incidentally, an appropriate angle $\theta$ at the angled part $e_4$ may be 80 degrees or narrower for the distal end thereof not to be magnetically saturated, and the magnetic line of force to be sufficiently concentrated on this point.

Figure 25A:
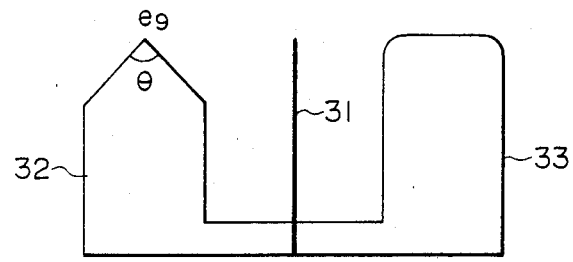
Figure 25B:
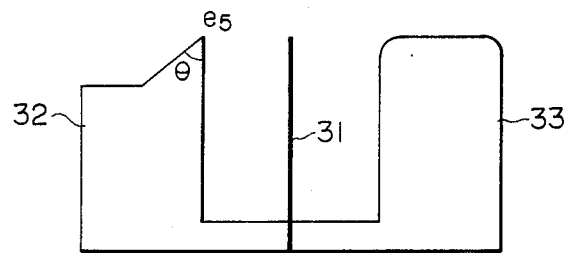
Figure 25C:
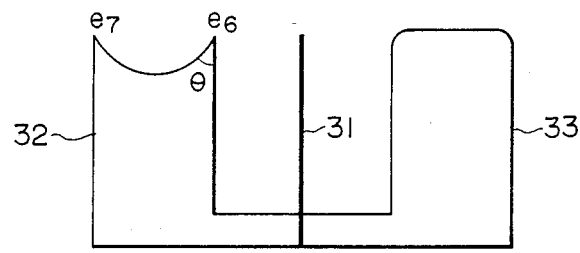
Figure 25D:
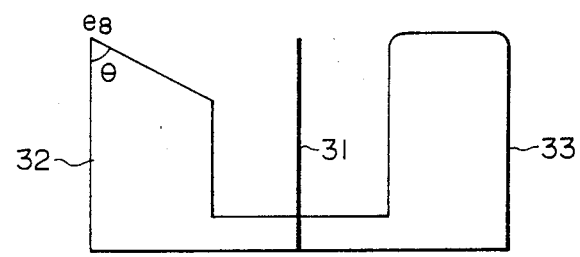

FIGS. 25A to 25D are respectively for explaining different embodiments of the first auxiliary magnetic pole 32, in which the embodiment in FIG. 25A has the angled part $e_9$ formed substantially at the center of its recording medium sliding surface; the embodiment in FIG. 25B has the angled part $e_5$ formed at the right half portion of its recording medium sliding surface; the embodiment in FIG. 25C has two projections $e_6$ and $e_7$ formed at both sides of its recording medium sliding surface, the middle portion between these projections $e_6$, $e_7$ being concave; and the embodiment in FIG. 25D has the angled part $e_8$ formed at the side of the leading edge of the auxiliary magnetic pole.

Incidentally, it should be noted that the embodiments shown in FIGS. 25A to 25D are only a few examples of the shape of the first auxiliary magnetic pole, the combination of these shapes and curves being entirely left to a designer's free choice. Which shape is to be adopted depends on the manner of working of the first auxiliary magnetic pole, the extent of its magnetic saturation, the recording and reproducing efficiency, and so forth.

Figures 26A, 26B, 27:
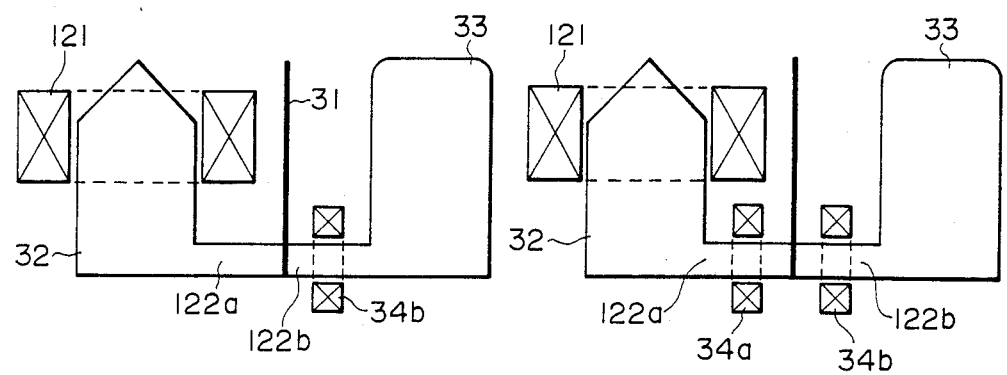

FIGS. 26A and 26B illustrate other embodiments for applying the energizing winding onto the first auxiliary magnetic pole 32. Since the magnetic flux to be emitted from the first auxiliary magnetic pole 32 should preferably be of as high an intensity as possible for the stable and definite orientation of the magnetization in the perpendicularly magnetizable recording layer, the winding should be provided at as near the distal end of the auxiliary magnetic pole 32 as possible for good results.

For the abovementioned reason, the embodiment shown in FIG. 26A provides the winding 121 at the distal end portion of the first auxiliary magnetic pole 32 by moving it from the connecting portion 122a thereof with the principal magnetic pole 31. The embodiment shown in FIG. 26B separates the energizing winding 121 for the bias magnetic field from the windings 34a, 34b for the signal magnetic fields. This construction is more suitable than the former for stabilizing both reversed magnetization and bias magnetic field.

FIG. 27 shows an embodiment, wherein the shape of the end face of the second auxiliary magnetic pole 33 has been modified. The figure of the drawing is a view of FIG. 26A when taken from the side of the recording medium sliding surface. A reference symbol $e_{10}$ designates a ridgeline which is non-parallel with the breadthwise direction of the track of the principal magnetic pole 31, thus forming an azimuth angle $\alpha$. When adopting such magnetic head construction, lowering of the SN ratio can be prevented which otherwise might be caused when the signal magnetization at this portion of the ridgeline $e_{10}$ is used as the electromotive force for the reproduction in case the energizing winding 121 and the windings 34a, 34b are serially connected at the time of the reproduction to obtain the electromotive force. That is to say, if an azimuth angle $\alpha$ is given between the rectilinear line passing the breadthwise direction of the track of the principal magnetic pole 31 and the ridgeline $e_{10}$, there is no possibility of a signal being reproduced at this ridgeline portion due to the azimuth loss so far as the signal is recorded by the principal magnetic pole 31. The azimuth angle may sufficiently be 7 degrees or larger.

In all of the above-described embodiments, only the recording by the d.c. bias magnetic field has been given as an example. It should be noted that the same effect can be expected as mentioned in the foregoing in the case of recording with the a.c. bias magnetic field. Furthermore, the substantially same effect can be expected without the second auxiliary magnetic pole at the sacrifice of the recording and reproducing efficiency.

As is apparent from the foregoing explanation, the present invention provides a magnetic head of a construction wherein the first and second auxiliary magnetic poles are arranged on one side facing the recording surface of the magnetic recording medium with the principal magnetic pole interposed between them, and wherein an angled portion is formed on the first auxiliary magnetic pole to the side of its magnetic recording medium sliding surface, and the corner portions of the second auxiliary magnetic pole are curved or rounded to the side of its recording medium sliding surface. On account of such construction, the first auxiliary magnetic pole can be utilized as the erasing magnetic pole, which makes it possible to eliminate a separate erasing magnetic pole which has been required in the conventional device, this elimination contributing to reduction in the number of component parts and reduction in size of the magnetic head. In addition, since the magnetic line of force does not concentrate on the rounded corner portions of the second auxiliary magnetic pole, the possibility of erroneous erasure can be reduced remarkably, and, also, since the ridgeline at the angled portion of the first auxiliary magnetic pole is given an azimuth angle with respect to the principal magnetic pole, signal reproduction from the auxiliary magnetic pole is inhibited, and a favorable SN ratio can be maintained. Thus, Problem D can be solved.

Figure 9A:
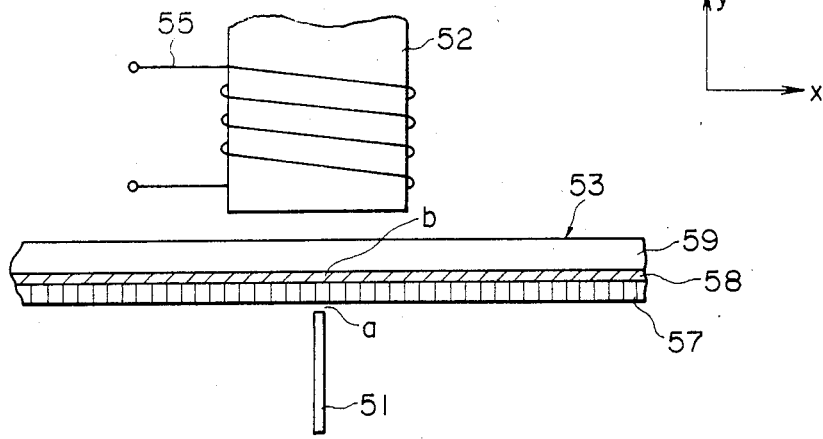
Figure 9B:
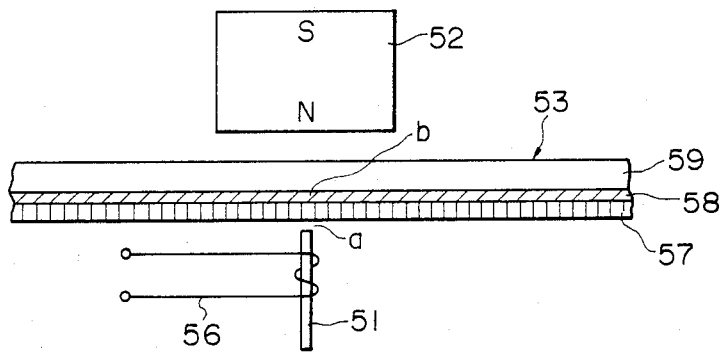
Figure 9C:
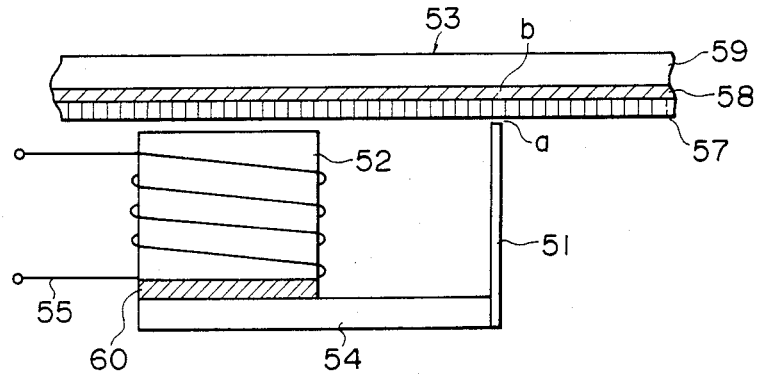
Figure 28:
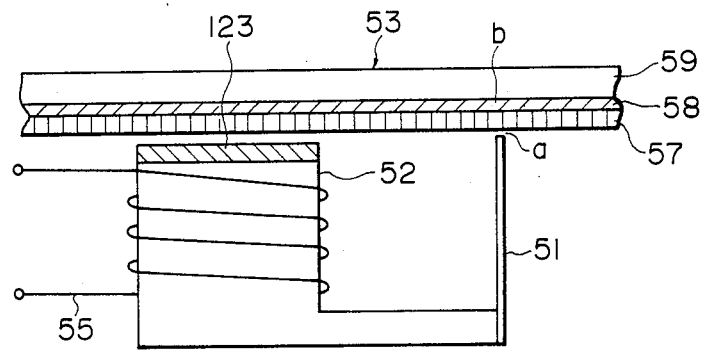
Figure 29A:
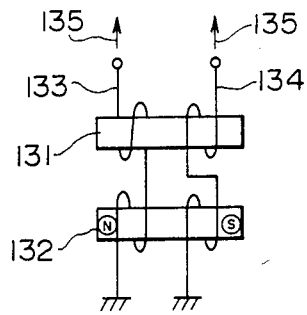
FIGS. 29A to 29D being respectively diagrams for explanation of the principle of load-sharing to be used in the present invention, FIG. 30 being a perspective view showing a structure of the magnetic head according to the present invention, FIG. 31 being a perspective view, in part, for explanation of an embodiment of the magnetic head of the present invention provided with the azimuth angle in a triangular wave shape, FIG. 32 being a perspective view showing one embodiment of the magnetic head according to the present invention, wherein the principal magnetic pole and the auxiliary magnetic pole are magnetically integrated, and FIG. 33 being a perspective view showing other embodiment of the present invention.
Figure 29B:
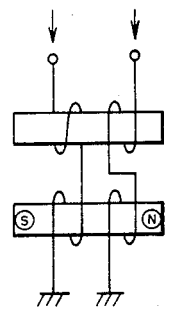
Figure 29C:
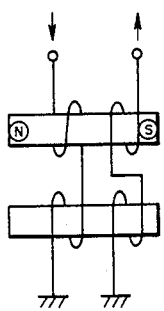
Figure 29D:
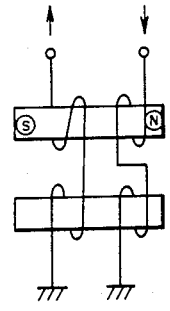

FIG. 28 indicates one embodiment of the present invention which solves Problem E. In the drawing, those parts which are identical with those in FIGS. 9A to 9C are designated by the same reference numerals.

In the illustrated embodiment, a thin film of the permanent magnet 123 is formed on the magnetic recording medium sliding surface of the auxiliary magnetic pole 52 which is magnetically connected with the principal magnetic pole 51. This permanent magnet thin film 123 can be formed by a thin film depositing method such as resistive heating vapor-deposition, ion-plating, electron beam evaporation, sputtering, plating, CVD (Chemical Vapor Deposition), and others. The magnetization direction of the permanent magnet thin film 123 is perpendicular to the surface of the perpendicularly magnetizable recording layer 57.

In such construction, the thickness of the permanent magnet thin film 123 may be approximately 50 μm or so, in case the magnetomotive force to reverse the magnetization in the perpendicularly magnetizable recording layer 57 is 20AT, because the residual magnetic flux density Br in it is 0.8 tesla when SmCo alloy is used as the material for the permanent magnet. When the residual magnetic flux density is greater than 0.8 tesla, the thin film permanent magnet can be made much thinner. On the contrary, when the residual magnetic flux density is smaller than 0.8 tesla, it should be made thick.

While consideration should be given for stabilization of the magnetic head so as not to cause the reversal of magnetization to occur in the vicinity of the principal magnetic pole when no energizing current flows through the winding 55 of the auxiliary magnetic pole 52, the flowing quantity of which is increased for the stabilization, the thin film permanent magnet 123 should be made much thinner in such instance. Whatever material may be used, the thickness should preferably be 200 μm or below.

The material for the permanent magnet has low reversible permeability, on account of which, if the permanent magnet thin film is thick, there inevitably is invited lowered reproduction efficiency. Accordingly, it should preferably be thinner within a permissible extent of the magnetomotive force as required.

Every sort of permanent magnetic material may be used for the permanent magnet thin film 123 of the present invention, though the materials having the reversible permeability as close as 1 are preferable from the standpoint of stability in the magnetization. In that sense, rare earth metals, Ba-ferrite and Sr-ferrite of cobalt alloy, and Co-Cr alloy are considered suitable. Of these preferred materials, SmCo alloy is highly recommendable, because it has the residual magnetic flux density as high as 0.8 to 1.2 tesla, coercive force as great as $7 \times 10^5$ AT/m, reversible permeability of substantially 1, and moreover it is capable of being subjected to the thin film deposition method.

On the other hand, Co-Cr alloy is, in most cases, used as the perpendicularly magnetizable recording layer 57. This material, too, has high residual magnetic flux density, and the reversible permeability of nearly 1. Therefore, when the material is used for the permanent magnet thin film, there occurs no magnetic reversal, even when the perpendicularly magnetizable recording layer 57 directly contacts thereto, because both permanent magnet thin film and recording layer are of the same material, hence it is an appropriate material. The same thing can be said, in general, if the perpendicularly magnetizable recording layer and the permanent magnet thin film are of the same material.

In the formation of the permanent magnet thin film 123, the thin film deposition method should preferably be adopted, since its thickness is 200 μm or below. Also, since the permanent magnet thin film 123 also constitutes the sliding surface of the recording medium (tape), it is simultaneously required to be wear-resistant. Accordingly, of various thin film deposition methods, sputtering, ion-plating, and plating methods capable of producing a hard film may be most suitable. With the permanent magnet thin film being formed by such methods, its wear-resistant property remarkably improves, so that the wear-resistant property of the auxiliary magnetic pole 52 is no longer problematical, and freedom in material selection can be expanded. By the way, the plating method is particularly excellent in its film-forming speed and productivity on an industrialized scale.

In the following, the principle of recording by the magnetic head of the above-described construction will be explained with reference to the hysteresis loop shown in FIG. 8.

It is assumed that the perpendicularly magnetizable recording layer 57 in the magnetic recording medium 53 has been magnetized in a certain definite direction beforehand by the erasing magnetic pole, etc. (not shown), and is at the point 40 in FIG. 8. When the magnetic recording medium moves and approaches the distal end of the principal magnetic pole 51, it is energized up to the point 41 by the magnetomotive force of the permanent magnet thin film 123. When the electric current is conducted through the winding 55 of the auxiliary magnetic pole, the recording medium is energized up to the point 43 by the magnetomotive force of the auxiliary magnetic pole to cause the reversal in magnetization, the state of which ultimately reaches the point 44.

When no current flows in the winding 55 of the auxiliary magnetic pole 52, the status at the point 40 is reinstated. Thus, the current quantity to be conducted through the winding 55 of the auxiliary magnetic pole 52 becomes less than half of a case where no permanent magnet is provided, hence the power consumption is reduced.

In the embodiment shown in FIG. 28, explanations have been given as to the only case where the principal and auxiliary magnetic poles are disposed on one and the same side of the magnetic recording medium. It should, however, be noted that the invention is equally applicable to a case where the principal and auxiliary magnetic poles are disposed with the magnetic recording medium interposed therebetween.

As is apparent from the foregoing explanations, the present invention provides a magnetic head having a permanent magnet thin film formed at the distal end of the auxiliary magnetic pole, on account of which the current amount to energize the auxiliary magnetic pole can be made small, the number of winding turns of the winding can be reduced, and the inductance can be decreased, whereby the frequency characteristic of the magnetic head improves. Further, since the permanent magnet thin film is extremely thin, the closed loop of the magnetic line of force can be efficiently formed at the time of the magnetic recording, whereby the reproduction efficiency and the writing efficiency as well improve. Furthermore, the permanent magnet thin film can be formed easily and at a low cost, its wear-resistant property is adequate, and the material for the auxiliary magnetic pole can be selected paying attention to its magnetic characteristic alone, hence freedom in the material selection expands. Thus, Problem E can be solved.

FIGS. 29A to 33 illustrate various constructions of the magnetic head to solve the Problem F.

FIGS. 29A to 29D indicate the principle of the winding structure for use in the present invention, wherein the load-sharing type matrix system has been adopted. In the drawing, the windings 133, 134 are wound around the magnetic poles 131, 132 in the illustrated directions. Electric current flows through each of the windings in the directions 135. When adopting such winding construction and arrangement, the magnetizing direction of the respective magnetic poles 131, 132 can be selected in various ways by changing the flowing direction of the current as shown, for example, in FIGS. 29A to 29D, hence the two magnetic poles 131, 132 can be arbitrarily selected by the two windings 133, 134.

In the FIGS. 29A to 29D embodiments, an example of the winding having a single winding turn has been shown, but the same results can be obtained even with a half winding turn or two or more winding turns. In the illustrated embodiments, there has been shown a case wherein two magnetic poles can be selected with two windings Generally speaking, with increase in the windings, as shown in the following Table 1, the selectable number of a magnetic poles remarkably increases. That is to say, with the number of the windings of 6 or more, the effect of the selection becomes apparent.

TABLE 1

| Number of Winding | Selectable Number of Magnetic Poles |
| --- | --- |
| 2 | 2 |
| 4 | 4 |
| 6 | 11 |
| 8 | 36 |
| 10 | 127 |
| 12 | 463 |
| 14 | 1,717 |
| 16 | 6,436 |
| 18 | 24,311 |
| 20 | 92,379 |

Figure 30:
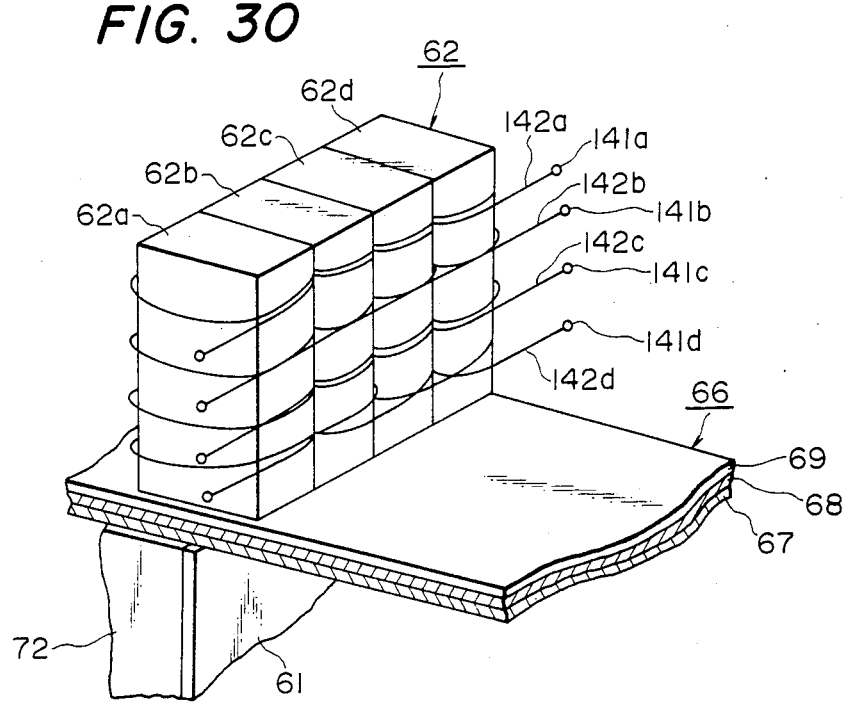

FIG. 30 illustrates one embodiment, in which the principle of the abovementioned load-sharing type winding construction is utilized in the auxiliary magnetic pole. In this embodiment, four auxiliary magnetic poles 62a to 62d are arranged in juxtaposition corresponding to the magnetic tracks in the recording medium 66. Each auxiliary magnetic pole has the auxiliary magnetic pole winding in a manner to be capable of the load-sharing, i.e., the windings 142a to 142d are resepectively wound around the auxiliary magnetic poles 62a to 62d. By applying electric current to the terminals 141a to 141d of the respective windings 142a to 142d with the current flowing direction being changed, any of the auxiliary magnetic poles 62a to 62d can be selected arbitrarily for the magnetic recording. In this embodiment, the principal magnetic pole 61 is a single magnetic thin film made of a highly permeable magnetic material, which is formed on the substrate 72.

Although, in the FIG. 30 embodiment, four terminals 141a to 141d are provided for the four auxiliary magnetic poles, the number of the terminal decreases with increase in the number of the auxiliary magnetic poles. In this case, with the decreased number of the terminals, the number of incidental circuit becomes less, whereby the entire volume of the device can be reduced. This system is highly suitable for the recording, which further facilitates realization of the multi-track construction in the magnetic recording head.

As to the reproduction of the recorded information, the reproduction signals can be obtained at the terminals 141a to 141d following the totally reversed route to that in the recording operation with the electromotive force induced in the load-sharing type auxiliary magnetic pole windings 142a to 142d. In place of such construction as mentioned above, it is feasible that the magneto-resistive element is formed in the multi-track construction for use as the reproduction head.

Figure 31:
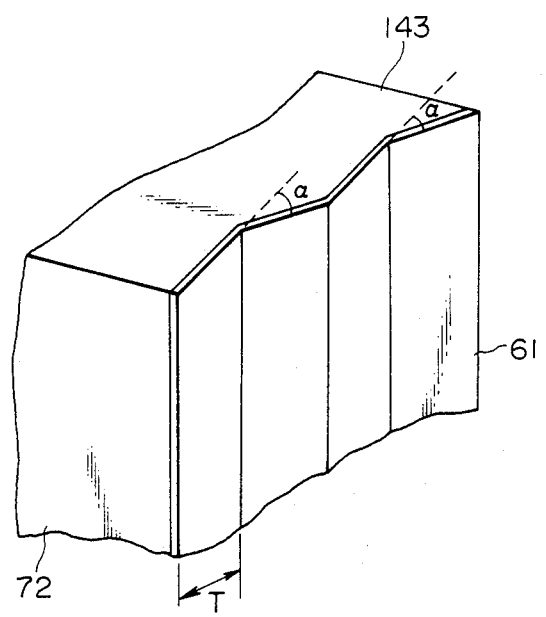

FIG. 31 shows one embodiment, for reducing crosstalk in the principal magnetic pole. In the drawing, a reference numeral 143 designates the recording medium sliding surface. The principal magnetic pole 61 is made of a highly permeable magnetic thin film, and provided on the principal magnetic pole substrate 72 which has been so formed as to having an angle α for each track width T, thus forming a triangularly-shaped surface. With such principal magnetic pole, the off-track characteristic at the time of the reproduction remarkably improves due to the azimuth angle α, which is effective for solving the problem of peak shift, etc.

For forming the principal magnetic pole substrate 72 in the triangularly-shaped surface, there may be utilized various methods such as, for example, etching, ion-milling, mechanical abrasion, and others.

Figure 32:
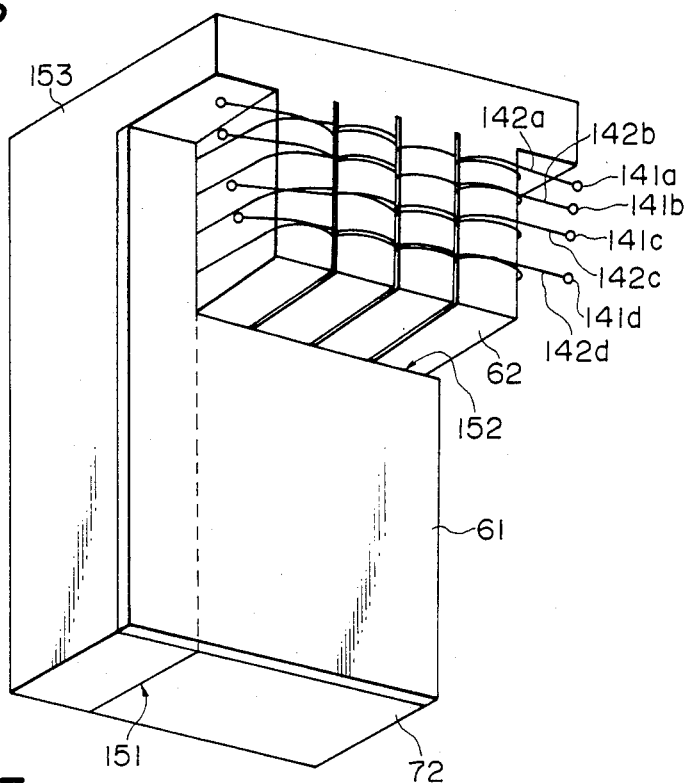

FIG. 32 illustrates one embodiment of the magnetic head according to the present invention, which has an improved recording efficiency. In the illustration, those parts which are identical with those in the above-described embodiment are designated by the same reference numerals, and the explanations thereof are dispensed with. In FIG. 32, the auxiliary magnetic pole 62 is constructed with four auxiliary magnetic poles, as an example, which are mounted on a monolithic substrate 153 of MnZn ferrite. This auxiliary magnetic pole substrate 153 is adhered to the principal magnetic pole substrate 72 through its adhesion surface 151. In this case, a slit 152 is formed between the principal magnetic pole 61 and the auxiliary magnetic pole 62 to permit passage of the recording medium therethrough.

In order to join the principal magnetic pole and the auxiliary magnetic poles according to this embodiment, the auxiliary magnetic pole substrate 153 is formed, to which the principal magnetic pole substrate 72 made of glass, etc. is adhered with a low melting point glass, followed by finishing the surface, where the principal magnetic pole is to be film-formed, as a mirror. After the surface finishing of the substrate 72, a highly permeable magnetic material is deposited thereon in a thickness of about 1 μm or so (by means of plating, CVD, vacuum deposition, sputtering, etc.). As the result, MnZn ferrite constituting both principal and auxiliary magnetic poles is magnetically connected, whereby the efficiency in recording and reproduction can be remakably increased. According to this fabrication process, no protective film for the principal magnetic pole on the substrate is provided. If it is required at all, such protective film can be provided after the film-forming operation of the principal magnetic pole, and the sliding surface of the recording medium is finished with an abrading type to attain the intended purpose.

Figure 33:
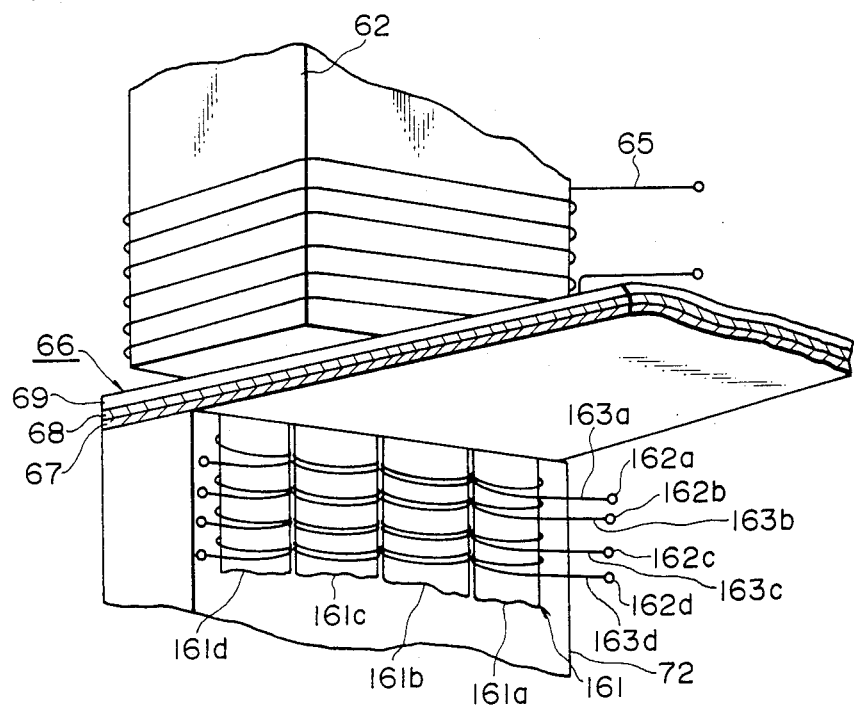

In the above-described embodiments, explanations have been given as to the example of applying the load-sharing type winding onto each of a plurality of auxiliary magnetic poles for a single principal magnetic pole. It should, however, be noted that the same effect can be obtained by providing the load-sharing type winding onto each of a plurality of principal magnetic poles for a single auxiliary magnetic pole. FIG. 33 shows an such embodiment.

In FIG. 33, the principal magnetic pole 161 composed of four individual magnetic pole components 161a to 161d are firm-formed on the substrate 72 in correspondence to the magnetic tracks by means of the thin film deposition method. On each of the principal magnetic pole components 161a to 161d, each of the load-sharing type windings 163a to 163d is wound respectively. Electric current is selectively applied to each of the respective terminals 162a to 162d, whereby any of the principal magnetic poles 161a to 161d can be arbitrarily selected to perform the perpendicular magnetic recording on the recording medium 66.

In the embodiment shown in FIG. 33, it is also possible that the principal magnetic pole is formed on the substrate 72 with an azimuth angle as explained above, thereby preventing cross-talk from occurring. Further, it is possible to magnetically connect the principal and auxiliary magnetic pole substrates, as shown in FIG. 32, to improve the recording efficiency.

As has been described in the foregoing, the present invention is so constructed that the load-sharing type winding is wound on either the auxiliary magnetic pole or the principal magnetic pole, from which the following effects derive.

(1) By making the auxiliary magnetic pole winding as the load-sharing type, the number of the winding terminals can be considerably reduced, whereby the multi-tracked perpendicular magnetic recording head of the auxiliary magnetic pole energizing type becomes feasible.

(2) Because of the utilization of load sharing, the considerable decrease in the number of winding terminals contributes to reduction in the number of incidental circuits, whereby the circuit construction, which has so far been the problem in realizing the multi-track structure, can be simplified, and the overall volume of the device can be reduced for the eliminated circuit. This effect also applies in the case of the principal pole energizing type.

(3) By providing the azimuth angle on the principal magnetic pole for each track in a triangular shape, the off-track characteristic of the magnetic head improves.

(4) By magnetically connecting both auxiliary and principal magnetic poles into an integral whole, the recording efficiency improves, and, when the load-sharing type auxiliary magnetic pole winding of this magnetic head is used for reproduction, its reproduction efficiency also improves.

What we claim is:

1. A perpendicular magnetic head operable in cooperation with a magnetic recording medium having a planar magnetizable recording surface and that has been perpendicularly magnetized in a predetermined direction, said head comprising:
    a principal magnetic pole including a magneto-resistive element and mountable so as to face said surface of the magnetic recording medium;
    an auxiliary magnetic pole made of a magnetic material and mountable so as to face a second surface of said magnetic recording medium, said auxiliary magentic pole being magnetically connected with said principal magnetic pole;
    a coil wound around said auxiliary magnetic pole; and
    a permanent magnet disposed on and in magnetic communication with said auxiliary magnetic pole between the magnetic recording medium and said auxiliary magnetic pole.

2. The magnetic head as set forth in claim 1, wherein said auxiliary magnetic pole has a magnetic recording medium sliding surface, said permanent magnet comprises a thin film formed on the recording medium sliding surface of said auziliary magneitc pole by a thin film deposition process.

3. The magnetic head as set forth in claim 2, wherein said permanent magnet is formed by one of thin film deposition processes selected from among the group consisting of plating, sputtering, and ion-plating.

4. The magnetic head as set forth in claim 3, wherein said thin film magnet formed by the thin film deposition process has a thickness of no greater than 200 $\mu$m.

5. The magnetic head as set forth in claim 2 or 3, wherein said thin film magnet formed by the thin film deposition process is of the same material as said magnetic recording medium.

6. The magnetic head as set forth in claim 2 or 3, wherein the material for said thin film magnet formed by the thin film deposition process is selected from the group consisting of SmCo alloy, CoCr alloy, Ba ferrite, Sr ferrite, and a combination of a plurality of these alloys.

7. A perpendicular magnetic head operable in cooperation with a multisided magnetic recording medium driven by driven means in a running direction and which has been magnetized in a predetermined direction perpendicular to the running direction, said head comprising:
    a plurality of magnetic poles, including at least first and second magnetic poles, mountable in opposition to one side surface of the magnetic recording medium for magnetizing the magnetic recording medium which has been perpendicularly magnetized, in a predetermined direction substantially perpendicular to the running direction;
    a plurality of coils, for energizing said plurality of magnetic poles, including at least first ans second wires each wound about and forming coils on each of said poles, wherein said first first and second wires are wound on to said first and second magnetic poles such that said first and second wires are wound in the same direction on said first magnetic pole and in the directions opposite to each other on said second magnetic pole; and
    a third magnetic pole mounted in opposition to said first magnetic pole and having a plurality of poles arranged to confront another side surface of the magnetic recording medium.

8. The magnetic head as set forth in claim 7, further comprising a substrate and wherein one of said first and second magnetic poles is provided on said substrate as a thin film and having an azimuth angle.

9. The magnetic head as set forth in claim 7, wherein said first magnetic pole is integrally, structurally coupled with said magnetic pole.

10. The magnetic head as set forth in claim 9, further comprising a substrate and wherein one of said first and second magnetic poles is provided on said substrate as a thin film.

11. A perpendicular magnetic head operable in cooperation with a magnetic recording medium having two side surfaces driven by drive means in a running direction, said head comprising:
    magnetizing means for magnetizing the magnetic recording medium in a predetermined direction substantially perpendicular to the running direction thereof;

a first magnetic pole for reversing, to a direction opposite the predetermined direction, the magnetization in the magnetic recording medium as magnetized by said magnetizing means; and a second magnetic pole for controlling reversal of the magnetization in the magnetic recording medium by said first magnetic pole;

wherein said second magnetic pole has a winding wound thereon to inhibit the reversal of magnetization in said magnetic recording medium by said first magnetic pole upon conduction of electric current therethrough.

12. The magnetic head as set forth in claim 11, wherein a portion of said second magnetic pole is rendered magnetically saturated by current conduction through the winding wound therearound, thereby inhibiting reversal of the magnetization in the magnetic recording medium.

13. The magnetic head as set forth in claim 11, further comprising a permanent magnet and wherein at least a part of magnetomotive force to be imparted to said magnetizing means and to said first magnetic pole is obtained from said permanent magnet.

14. The magnetic head as set forth in claim 11, wherein the polarity of magnetization which said first and said second magnetic poles produce in said magnetic recording medium is caused to coincide by flowing electric current through said winding wound on said second magnetic pole.

15. The magnetic head as set forth in claim 11, wherein a portion of said second magnetic pole is heated at least to the Curie temperature by flowing electric current through said winding wound on said second magnetic pole, thereby inhibiting reversal of magnetization in said magnetic recording medium.

16. The magnetic head as set forth in claim 11, wherein the thickness of the winding wound on said second magnetic pole in the direction perpendicular to said magnetic recording medium is made longer than the maximum recording wavelength of a signal to be recorded on said magnetic recording medium.

17. A perpendicular magnetic head operable in cooperation with a magnetic recording medium having two side surfaces driven by drive means in a running direction, said head comprising:

magnetizing means for magnetizing the magnetic recording medium in a predetermined direction substantially perpendicular to the running direction thereof;

a first magnetic pole for reversing, to a direction opposite the predetermined direction, the magnetization in the magnetic recording medium as magnetized by said magnetizing means; and a second magnetic pole for controlling reversal of the magnetization in the magnetic recording medium by said first magnetic pole;

wherein said magnetizing means and said first and second magnetic poles are all disposable on one side surface of said magnetic recording medium, wherein said magnetic recording medium is slidable on one surface of said magnetic poles, and wherein the surface of said magnetic poles, on which the magnetic recording medium is slidable, is curved.

18. The magnetic head as set forth in claim 17, wherein the radius of curvature of said curved surface of said magnetic poles is in the range from 3 to 20 mm.

19. The magnetic head as set forth in claim 11, comprising one first magnetic pole and a plurality of second magnetic poles disposed in confrontation to said one first magnetic pole.

20. The magnetic head as set forth in claim 11, further comprising a perpendicular magnetic head for reproduction including a magnetoresistive element, said reproducing magnetic head being disposed on the exit side in the running direction of the magnetic recording medium opposite said magnetizing means with said second magnetic pole being interposed therebetween.

21. A perpendicular magnetic head operable in cooperation with a magnetic recording medium having two side surfaces and driven by drive means in a running direction, said head comprising:

magnetizing means for magnetizing the magnetic recording medium in a predetermined direction substantially perpendicular to the running direction;

a first magnetic pole including a permanent magnet and disposable in confrontation to one side surface of the magnetic recording medium for reversing, to a direction opposite opposite to the predetermined direction, the magnetization in the magnetic recording medium effected by said magnetizing means; and a second magnetic pole and a winding wound therearound, disposable in confrontation to the other side surface of the magnetic recording medium for controlling reversal of the magnetization in the magnetic recording medium effected by said first magnetic pole.

22. The magnetic head as set forth in claim 21, wherein said first magnetic pole is cylindrical and further comprising means for supporting said first magnetic pole on an axis in a freely rotatable manner.

23. The magnetic head as set forth in claim 22, wherein said cylindrical first magnetic pole is magnetized in different polarity at the center and the outer periphery of the cylinder.

24. The magnetic head as set forth in claim 22, wherein said cylindrical first magnetic pole has two portions divided at the middle portion thereof in the axial direction of said cylinder, said two divided portions being butt-connected with the interfacial part being magnetized in the same polarity.

25. The magnetic head as set forth in claim 22, wherein said cylindrical first magnetic pole has an outer cylindrical magnetic pole portion thereof made of an elastic member.

26. The magnetic head as set forth in claim 22, wherein said cylindrical first magnetic pole has a thin thin film layer of permanent magnet formed on the outer periphery thereof.

* * * * *